(12) United States Patent
Bjontegaard et al.

(10) Patent No.: US 7,920,629 B2
(45) Date of Patent: *Apr. 5, 2011

(54) CONTEXT-ADAPTIVE VLC VIDEO TRANSFORM COEFFICIENTS ENCODING/DECODING METHODS AND APPARATUSES

(75) Inventors: Gisle Bjontegaard, Oppegaard (NO); Karl O. Lillevold, Seattle, WA (US)

(73) Assignee: RealNetworks, Inc., Seattle, WA (US)

( * ) Notice: Subject to any disclaimer, the term of this patent is extended or adjusted under 35 U.S.C. 154(b) by 751 days.

This patent is subject to a terminal disclaimer.

(21) Appl. No.: 11/467,531

(22) Filed: Aug. 25, 2006

(65) Prior Publication Data

US 2007/0041449 A1    Feb. 22, 2007

Related U.S. Application Data

(62) Division of application No. 10/232,337, filed on Aug. 30, 2002, now Pat. No. 7,099,387.

(60) Provisional application No. 60/367,032, filed on Mar. 22, 2002.

(51) Int. Cl.
*H04B 1/66* (2006.01)

(52) U.S. Cl. ......... 375/240.18; 375/240.23; 375/240.24; 375/240.25; 375/240.26; 382/233; 382/235; 382/246; 382/245; 341/67; 341/65; 341/59; 341/56

(58) Field of Classification Search ............. 375/240.18, 375/240.23, 240.24, 240.25, 240.26; 382/233, 382/235, 246, 245; 341/67, 65, 59, 56
See application file for complete search history.

(56) References Cited

U.S. PATENT DOCUMENTS

| | | | |
|---|---|---|---|
| 5,510,785 A * | 4/1996 | Segawa et al. | 341/67 |
| 6,696,993 B2 * | 2/2004 | Karczewicz | 341/67 |
| 7,099,387 B2 * | 8/2006 | Bjontegaard et al. | 375/240 |

* cited by examiner

*Primary Examiner* — Shawn An
(74) *Attorney, Agent, or Firm* — AEON Law; Adam L. K. Philipp

(57) ABSTRACT

Transform coefficients of sample blocks of a macroblock of a video picture are encoded by adaptively encoding a combination, the number of non-zero coefficients before the trailing one coefficients and the number of trailing one coefficients. The transform coefficients may be further encoded by adaptively encoding one or more of the signs of the trailing one coefficients, the level measures of the interposed in the non-zero coefficients. Adaptive encoding of the number and trailing one coefficients may be performed in view of one or more neighboring sample blocks, whereas adaptive encoding of level measure may be performed in view of quantization parameters of a macroblock and previously encoded level measures. Decoding may be performed in an inverse manner.

62 Claims, 7 Drawing Sheets

CONTEXT-ADAPTIVE VLC VIDEO TRANSFORM COEFFICIENTS ENCODING/DECODING METHODS AND APPARATUSES

RELATED INVENTIONS

The present application is a divisional application of U.S. patent application Ser. No. 10/232,337, filed on Aug. 30, 2002, which is a non-provisional application of U.S. provisional application No. 60/367,032, filed on Mar. 22, 2002, and claims priority to said provisional application, the entireties of which are hereby incorporated by reference.

FIELD

The present invention relates to the field of video encoding/decoding. more specifically, the present invention is related to the encoding of transform coefficients of (luma/chroma) blocks of a macroblock of a picture, and decoding of the encodings.

BACKGROUND

Advances in microprocessor and video related technologies have led to wide spread deployment and adoption of numerous types of video devices. Examples of such video devices include but are not limited to digital camcorders, digital versatile disk (DVD) players, video enabled laptop and desktop computing devices as well as servers, and so forth.

Advances in networking, telecommunication, satellite and other related technologies have also led to increase in on demand and/or real time online delivery of video, including delivery over public networks, such as the Internet.

Whether videos are delivered offline (e.g. from a DVD player) or online (e.g. from a video server), high quality video inherently requires a high volume of data. Thus, video delivery and rendering often involve encoding and decoding to reduce the amount of data to be stored, retrieved and/or transmitted.

Encoding/decoding of a video often involves processing the video as a stream of pictures. Each picture may be a field or a frame (typically consisting of two interleaved fields), and decomposed into a number of macroblocks. Each macroblock is often sub-divided into blocks of various sizes, which are transformed and quantized into a number of samples, luma and/or chroma samples of various types.

A number of encoding/decoding techniques are known in the art. For example, one technique encodes the various parameters of a macroblock using a single variable length coding (VLC) scheme. The technique is simple to practice, however the amount of reduction in data, i.e. compression, is only moderately effective.

Other techniques, such as Context-based Adaptive Binary Arithmetic Coding (CABAC), employ context adaptation and arithmetic coding to improve overall effectiveness. However, techniques such as CABAC are complex, memory demanding, and difficult to practice.

What is needed is a context-adaptive technique that is more effective than conventional non-context-adaptive techniques, but less complex to practice than context-adaptive techniques known to-date.

BRIEF DESCRIPTION OF THE DRAWINGS

The present invention will be described by way of exemplary embodiments, hut not limitations, illustrated in the accompanying drawings in which like references denote similar elements, and in which.

DETAILED DESCRIPTION

The present invention includes a context-adaptive VLC transform coefficient encoder, a complementary decoder, devices equipped with these encoders and/or decoders, systems made up of such devices, and methods of operations of these elements, devices and systems, and related subject matters.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will be apparent to one skilled in the art that the present invention may be practiced without the specific details. In other instances, well-known features are omitted or simplified in order not to obscure the present invention.

Terminology

Parts of the description will he presented in video encoding and decoding terms, such as picture, macroblock, block, sample, luma, chroma, transform coefficients, zig-zag scan order, numbers, signs, levels, run lengths and so forth, consistent with the manner commonly employed by those skilled in the art to convey the substance of their work to others skilled in the art. These terms are well understood by those skilled in the art. In particular, in a video device, these quantities take the form of electrical, magnetic, or optical signals capable of being stored, transferred, combined, and otherwise manipulated through electrical and/or optical components of a processor, and its subsystems.

In various video encoding/decoding standards, encodings are organized in accordance with certain syntactical rules, thus they are also referred to as "syntax elements".

Section Headings, Order of Descriptions and Embodiments

Section headings are merely employed to improve readability, and they are not to be construed to restrict or narrow the present invention.

Various operations will be described as multiple discrete steps in turn, in a manner that is most helpful in understanding the present invention, however, the order of description should not be construed as to imply that these operations are necessarily order dependent. In particular, these operations need not be performed in the order of presentation. Overview The phrase "in one embodiment" is used repeatedly. The phrase generally does not refer to the same embodiment, however, it may. The terms "comprising", "having" and "including" are synonymous, unless the context dictates otherwise.

Overview

Figure 1:
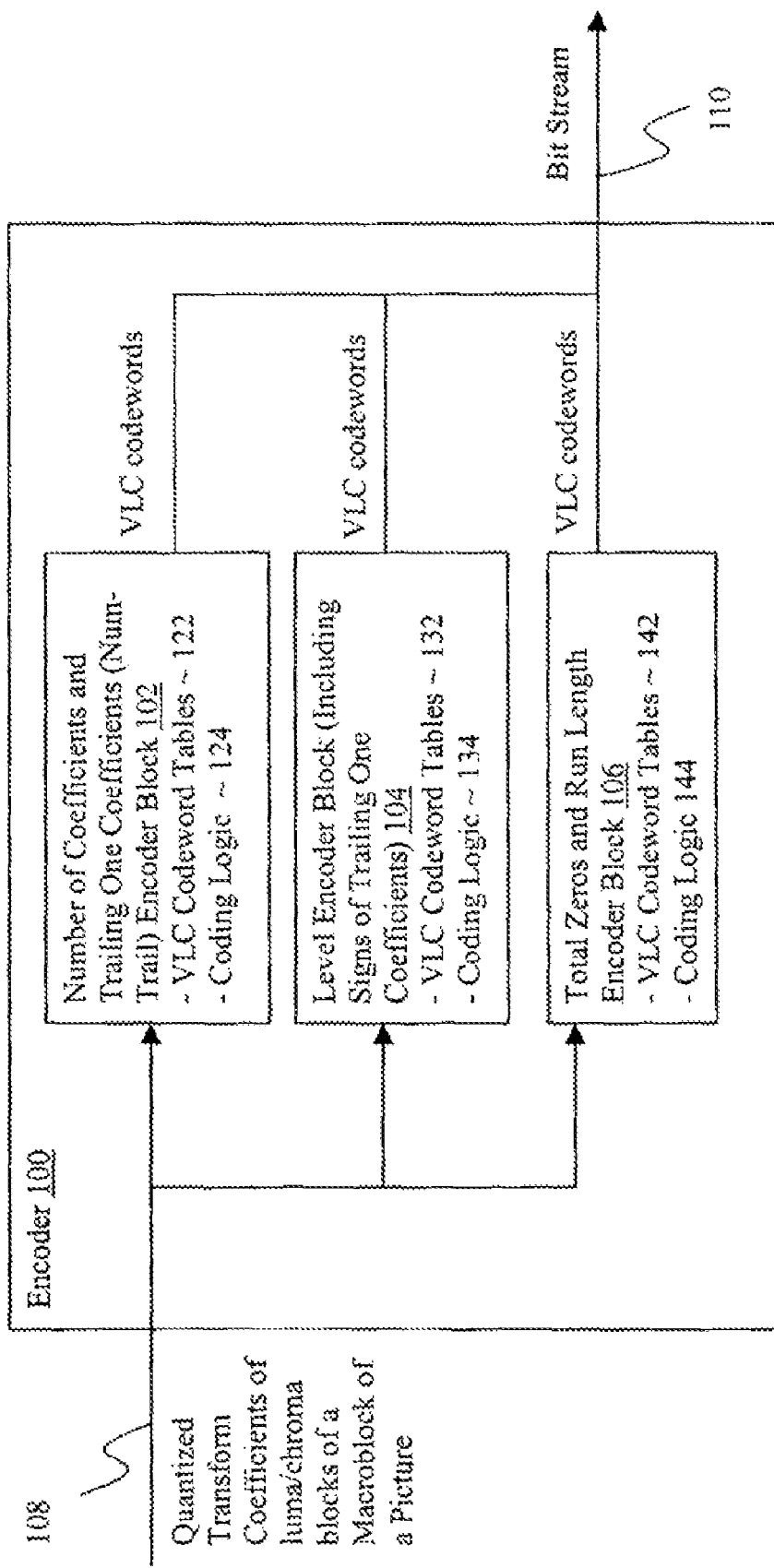
FIG. 1 illustrates an overview of a context-adaptive VLC encoder of the present invention for encoding transform coefficients of a (luma/chroma) blocks of a macroblock of a picture, in accordance with one embodiment.

FIG. 1 illustrates an overview of a context-adaptive VLC encoder of the present invention for encoding transform coefficients of (luma/chroma) blocks of a macroblock of a picture, in accordance with one embodiment. As illustrated, for the embodiment, context-adaptive VLC encoder 100 includes encoder blocks 102-106, which are coupled to input 108 of encoder 100 in parallel to receive quantized transform coefficients of (luma/chroma) blocks of macroblocks of pictures of a video. In response, encoder blocks 102-104 encode the received transform coefficients of the (luma/chroma) blocks into VLC codewords, and output the VLC codewords as a bit stream at output 110. VLC codewords are also referred as "encodings" of the transform coefficients (or "syntax elements").

More specifically, encoder block 102 is equipped with VLC codeword tables 122 and coding logic 124 to adaptively select one of the VLC codeword tables 122 to encode in a combined manner, the number of coefficients and the number of trailing one coefficients in each block of a macroblock (Num-Trail). That is, the number of coefficients and the number of trailing one coefficients in each block of a macroblock is advantageously encoded by a single VLC codeword. Encoder block 102 is referred to as Num-Trail encoder block 102 for short.

"Trailing one coefficients", as the term suggests, refers to the "1" value coefficients at the "back" of a block's transform coefficients, which are typically arranged in accordance with a zig-zag scan order. A zig-zag scan order is a sequential ordering of the transform coefficients from (approximately) the lowest spatial frequency to the highest. The orientation of "front" and "back" is seen from the "order" perspective. For example, if the sample blocks' transform coefficients are 5001201101001111, the last four "1" transform coefficients (counting from the back) are referred to as the trailing one coefficients, or T1's.

In one embodiment, the length of the trailing one coefficients is clipped at (counting from the "back" of the series of transform coefficients). That is, for the embodiment, for the purpose of encoding, the longest length of the T1 coefficients is limited to 3. The "excluded" trailing one coefficients are encoded "normally" as "non-zero coefficients" before the trailing one coefficients.

In alternate embodiments, the present invention may be practiced with greater, or smaller, longest length for the T1 coefficients.

Encoder block 104 is equipped with VLC codeword tables 132 and coding logic 134 to adaptively select one of the VLC codeword tables 132 to encode the level measure (or simply, level) of each non-zero coefficient before the trailing one coefficients of the sample blocks (including the "excluded" or "clipped" trailing one coefficients, if any). In other words, under the present invention, unlike the prior art, number of coefficients and levels of the non-zero coefficients are advantageously encoded separately. Encoder block 104 is referred to as Level encoder block 104 for short.

In one embodiment, Level encoder block 104 is also equipped to encode the signs of the T1 coefficients (Sign-Trail). In alternate embodiments, encoding of the signs of the T1 coefficients may e.g. be encoded by the Num_Trail encoder 102 instead.

Encoder block 106 is equipped with VLC codeword tables 142 and coding logic 144 to encode the total number zero coefficients interposed between non-zero coefficients of a block, and their respective run lengths (TotalZeros and RunLengths). In the earlier example, there are a total of 6 zeros interposed among the non-zero, and their respective run lengths are 2, 1, 1, 2. Encoder block 106 is referred to as TotalZero-RunLength encoder block 106.

In one embodiment, each macroblock comprises 16 (4×4) blocks of luma samples, eight corresponding 4×4 chroma AC blocks, and two 2×2 chroma DC blocks. The corresponding output formats are as follows:

Luma
{[NumTrail Sign-Trail Levels(16) TotalZeros RunLengths]t4}*4
Chroma D C
[NumTrail Sign-Trail Levels(4) TotalZeros RunLengths]*2
Chroma AC
{[NumTrail Sign-Trail Levels(15) TotalZeros RunLengths]*4}*2

For macroblock types known as Intra 16×16, there is one Intra 16×16 DC sample block and 16 Intra 4×4 AC sample blocks, the corresponding output formats are as follows:
Intra 16×16 DC
NumTrail Sign-Trail Levels(16) TotalZeros RunLengths
Intra 16×16 AC
[NumTrail Sign-Trail Levels(15) TotalZeros RunLengths]*16 (4×4 blocks)

Except for the novel VLC codeword tables 122, 132 and 142, and coding logics 124, 134 and 144 to adaptively select the appropriate VLC codeword table provided to encoder blocks 102-106, other aspects of encoder 100, including other aspects of encoder blocks 102-106 are known, and will not be further described.

In various embodiments, encoder 100 including encoding blocks 102-106 may be implemented in hardware, e.g. via application specific integrated circuit (ASIC) or in software, e.g. in programming languages such as C, or a combination of both.

Number and Trailing One Coefficient Encoder Block

In various embodiments, Num-Trail encoder block 102 includes three (3) VLC codeword tables for encoding transform coefficients of luma sample blocks, and one (1.) VLC codeword table for encoding transform coefficients of chroma sample blocks.

More specifically, in one embodiment, the three codeword tables for encoding form coefficients of luma sample blocks are:

TABLE 1

Luma Num-VLC0

| NumCf | T1 0 | 1 | 2 | 3 |
|---|---|---|---|---|
| 0 | 1 | — | — | — |
| 1 | 000011 | 01 | — | — |
| 2 | 00000111 | 0001001 | 001 | — |
| 3 | 000001001 | 00000110 | 0001000 | 00011 |
| 4 | 000001000 | 000001011 | 000000101 | 000010 |
| 5 | 0000000111 | 000001010 | 000000100 | 0001011 |
| 6 | 00000000111 | 0000000110 | 0000001101 | 00010101 |
| 7 | 000000001001 | 00000000110 | 0000001100 | 00010100 |
| 8 | 000000001000 | 00000001001 | 000000001010 | 000000111 |
| 9 | 0000000000111 | 000000001011 | 000000000101 | 0000000101 |
| 10 | 0000000000110 | 0000000001101 | 0000000001111 | 00000001000 |
| 11 | 00000000000011 | 0000000001100 | 0000000001110 | 000000000100 |
| 12 | 00000000000010 | 00000000000100 | 00000000000110 | 0000000000101 |
| 13 | 00000000000101 | 00000000000111 | 000000000010001 | 00000000001001 |
| 14 | 000000000000011 | 000000000000010 | 000000000010000 | 000000000000011 |
| 15 | 00000000000000001 | 0000000000000011 | 00000000000000010 | 0000000000000101 |
| 16 | 00000000000000000 | 000000000000001001 | 0000000000000010001 | 0000000000000010000 |

TABLE 2

Luma Num-VCL1

| NumCf\ | T1s 0 | 1 | 2 | 3 |
|---|---|---|---|---|
| 0 | 11 | — | — | — |
| 1 | 000011 | 011 | — | — |
| 2 | 000010 | 00011 | 010 | — |
| 3 | 001001 | 001000 | 001010 | 101 |
| 4 | 1000001 | 001011 | 100101 | 0011 |
| 5 | 00000111 | 1000000 | 1000010 | 00010 |
| 6 | 00000110 | 1000011 | 1001101 | 10001 |
| 7 | 000001001 | 10011101 | 10011100 | 100100 |
| 8 | 000001000 | 000001011 | 000000101 | 1001100 |
| 9 | 0000000111 | 000001010 | 000000100 | 10011111 |
| 10 | 0000000110 | 0000001101 | 0000001100 | 10011110 |
| 11 | 00000000101 | 00000000111 | 00000001001 | 000000111 |
| 12 | 00000000100 | 00000000110 | 00000001000 | 0000000101 |
| 13 | 000000000011 | 000000000010 | 000000000110 | 000000000111 |
| 14 | 0000000000011 | 000000000101 | 0000000000010 | 0000000001101 |
| 15 | 00000000000001 | 00000000000000 | 000000000000111 | 0000000001100 |
| 16 | 000000000000101 | 000000000000100 | 0000000000001101 | 0000000000001100 |

TABLE 3

Luma Num-VLC0

| NumCf\ | T1s 0 | 1 | 2 | 3 |
|---|---|---|---|---|
| 0 | 0011 | — | — | — |
| 1 | 0000011 | 0010 | — | — |
| 2 | 0000010 | 101110 | 1101 | — |
| 3 | 000011 | 101001 | 010110 | 1100 |
| 4 | 000010 | 101000 | 010001 | 1111 |
| 5 | 101101 | 101011 | 010000 | 1110 |
| 6 | 101100 | 101010 | 010011 | 1001 |
| 7 | 101111 | 010101 | 010010 | 1000 |

TABLE 3-continued

Luma Num-VLC0

| | T1s | | | |
|---|---|---|---|---|
| NumCf\ | 0 | 1 | 2 | 3 |
| 8 | 0110101 | 010100 | 011101 | 00011 |
| 9 | 0110100 | 010111 | 011100 | 00010 |
| 10 | 0110111 | 0110110 | 0110000 | 011111 |
| 11 | 01111001 | 0110001 | 01111010 | 0110011 |
| 12 | 01111000 | 01111011 | 01100101 | 01100100 |
| 13 | 000000011 | 000000010 | 000000100 | 000000111 |
| 14 | 0000000011 | 000000101 | 0000001101 | 0000001100 |
| 15 | 0000000010 | 00000000011 | 00000000010 | 00000000001 |
| 16 | 0000000000001 | 000000000001 | 00000000000001 | 00000000000000 |

The single codeword table for encoding transform coefficients of chroma sample blocks is:

TABLE 4

Chroma Num-VLC

| | T1s | | | |
|---|---|---|---|---|
| NumCf\ | 0 | 1 | 2 | 3 |
| 1 | 0001 | 1 | — | — |
| 2 | 00001 | 0001 | 01 | — |
| 3 | 00110 | 000001 | 001010 | 00100 |
| 4 | 0000001 | 00000000 | 00000001 | 001011 |

In alternate embodiments, different number of VLC codeword tables and different VLC codewords, including the manner the VLC codewords are stored, may be used. More specifically, in some embodiments, the VLC codewords may themselves be stored in a storage space saving form of {p, L}, where p stands for the explicitly enumerated portion of a codeword, and L stands for the length of the particular codeword. The non-enumerated portion of a VLC codeword is zero filled from the front when the VLC codeword is used, e.g. "0100 8" becomes 00000100.

In particular, in one alternate embodiment, the VLC codeword tables for encoding transform coefficients of luma sample blocks are:

TABLE 5

Luma Num-VLC0

| | T1s | | | |
|---|---|---|---|---|
| NumCfeff | 0 | 1 | 2 | 3 |
| 0 | 1 1 | — | — | — |
| 1 | 0101 6 | 01 2 | — | — |
| 2 | 0111 8 | 0100 6 | 0001 3 | — |
| 3 | 0111 9 | 0110 8 | 0101 7 | 0011 5 |
| 4 | 0111 10 | 0110 9 | 0101 8 | 0011 6 |
| 5 | 0111 11 | 0110 10 | 0101 9 | 0100 7 |
| 6 | 1111 13 | 0110 11 | 0101 10 | 0100 8 |
| 7 | 1011 13 | 1110 13 | 0101 11 | 0100 9 |
| 8 | 1000 13 | 1010 13 | 1101 13 | 0100 10 |
| 9 | 1111 14 | 1110 14 | 1001 13 | 0100 11 |
| 10 | 1011 14 | 1010 14 | 1101 14 | 1100 13 |
| 11 | 1111 15 | 1110 15 | 1001 14 | 1100 14 |
| 12 | 1011 15 | 1010 15 | 1101 15 | 1000 14 |
| 13 | 1111 16 | 0000 15 | 1001 15 | 1100 15 |
| 14 | 1011 16 | 1110 16 | 1101 16 | 1000 15 |
| 15 | 0111 16 | 1010 16 | 1001 16 | 1100 16 |
| 16 | 0100 16 | 0110 16 | 0101 15 | 1000 16 |

TABLE 6

Luma Num-VLC1

| | T1s | | | |
|---|---|---|---|---|
| NumCoeff | 0 | 1 | 2 | 3 |
| 0 | 11 2 | — | — | — |
| 1 | 1011 6 | 10 2 | — | — |
| 2 | 0111 6 | 0111 5 | 011 3 | — |
| 3 | 0111 7 | 1010 6 | 1001 6 | 0101 4 |
| 4 | 0111 8 | 0110 6 | 0101 6 | 0100 4 |
| 5 | 0100 8 | 0110 7 | 0101 7 | 0110 5 |
| 6 | 0111 9 | 0110 8 | 0101 8 | 1000 6 |
| 7 | 1111 11 | 0110 9 | 0101 9 | 0100 6 |
| 8 | 1011 11 | 1110 11 | 1101 11 | 0100 7 |
| 9 | 1111 12 | 1010 11 | 1001 11 | 0100 9 |
| 10 | 1011 12 | 1110 12 | 1101 12 | 1100 11 |
| 11 | 1000 12 | 1010 12 | 1001 12 | 1000 11 |
| 12 | 1111 13 | 1110 13 | 1101 13 | 1100 12 |
| 13 | 1011 13 | 1010 13 | 1001 13 | 1100 13 |
| 14 | 0111 13 | 1011 14 | 0110 13 | 1000 13 |
| 15 | 1000 14 | 1000 14 | 1010 14 | 0001 13 |
| 16 | 0111 14 | 0110 14 | 0101 14 | 0100 14 |

TABLE 7

Luma Num-VLC2

| | T1s | | | |
|---|---|---|---|---|
| NumCf | 0 | 1 | 2 | 3 |
| 0 | 1111 4 | — | — | — |
| 1 | 1111 4 | 1110 4 | — | — |
| 2 | 1011 6 | 1111 5 | 1101 4 | — |
| 3 | 1000 6 | 1100 5 | 1110 5 | 1100 4 |
| 4 | 1111 7 | 1010 5 | 1011 5 | 1011 4 |
| 5 | 1011 7 | 1000 5 | 1001 5 | 1010 4 |
| 6 | 1001 7 | 1110 6 | 1101 6 | 1001 4 |
| 7 | 1000 7 | 1010 6 | 1001 6 | 1000 4 |
| 8 | 1111 8 | 1110 7 | 1101 7 | 1101 5 |
| 9 | 1011 8 | 1110 8 | 1010 7 | 1100 6 |
| 10 | 1111 9 | 1010 8 | 1101 8 | 1100 7 |
| 11 | 1011 9 | 1110 9 | 1001 8 | 1100 8 |
| 12 | 1000 9 | 1010 9 | 1001 9 | 1000 8 |
| 13 | 1101 10 | 0111 9 | 1001 9 | 1100 9 |
| 14 | 1001 10 | 1100 10 | 1011 10 | 1010 10 |
| 15 | 0101 10 | 1000 10 | 0111 10 | 0110 10 |
| 16 | 0001 10 | 0100 10 | 0011 10 | 0010 10 |

The codeword table for encoding transform coefficients of chroma sample blocks is:

TABLE 8

Chroma Num-VLC

| NumCoeff | T1s | | | |
|---|---|---|---|---|
| | 0 | 1 | 2 | 3 |
| 0 | 01 2 | — | — | — |
| 1 | 111 6 | 1 1 | — | — |
| 2 | 100 6 | 110 6 | 001 3 | — |
| 3 | 011 6 | 011 7 | 010 7 | 101 6 |
| 4 | 010 6 | 011 8 | 010 8 | 000 7 |

Figure 2:
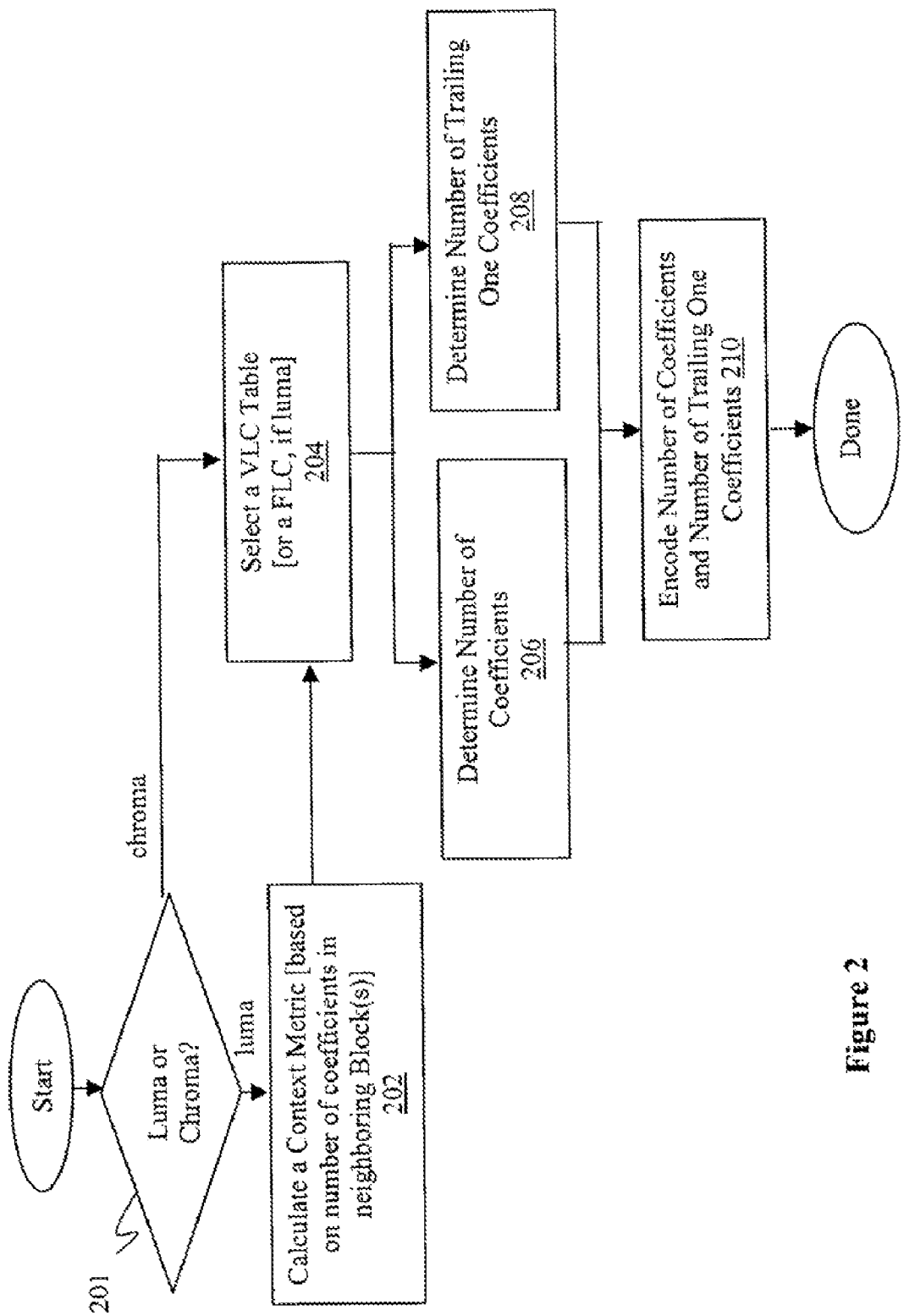
FIG. 2 illustrates the operational flow of the relevant aspects of the encoder block of FIG. 1 for encoding in a combined manner, number of coefficients and number of trailing one coefficients of a series of transform coefficients of (luma/chroma) blocks of a macroblock of a picture, in accordance with one embodiment.

FIG. 2 illustrates the operational flow of the relevant aspects of the encoder block of FIG. 1 for encoding in a combined manner, number of coefficients and number of T coefficients of a series of transform coefficients of (luma/chroma) blocks of a macroblock of a picture, in accordance with one embodiment. As illustrated, for the embodiment, upon receipt of the transform coefficients of (luma/chroma) blocks of a macroblock of a picture, coding logic 124 of Num-Trail encoder block 102 first determines if the sample block is a luma or a chroma sample block, block 201. In various embodiments, information denoting whether the current transform coefficients are coefficients of luma or chroma sample blocks is provided in conjunction with the coefficients, and coding logic 124 determines the sample block type based on the companion information provided.

For the 3 luma and 1 chroma VLC codeword table embodiment, upon determining the sample block is a chroma sample block, coding logic 124 of Num-Trail encoder block 102 proceeds to select the chroma VLC codeword tables to encode the transform coefficients, block 204.

However, if the current sample block is a luma sample block, coding logic 124 of Num-Trail encoder block 102 first determines a context metric for use to assist in the context adaptive selection of one of the multiple luma VLC codeword tables provided. In various embodiments, coding logic 124 of Num-Trail encoder block 102 computes an average number of transform coefficients in one or more selected neighboring sample blocks as the context metric (Avg). More specifically, in one embodiment (where the sample blocks of a macroblock are provided in the conventional zig-zag manner), coding logic 124 calculates Avg of the sample block above and the sample block to the left of the current sample block as the context metric.

In the degenerate case where there is no sample block above, Avg is set to the number of transform coefficients in the sample block to the left of the current sample block. In like manner, in the degenerate case where there is no sample block to the left of the current sample block, Avg is set to the number of transform coefficients in the sample block above. In the degenerate case where there is no sample block above nor sample block to the left of the current sample block, Avg is set to zero.

In one embodiment, coding logic 124 of Num-Trail encoder block 102 selects the VLC codeword tables as follows:

if (0<=Avg<2) select codeword table NumVLC0/Num-VLC0';

if (2<=Avg<4) select codeword table NumVLC1/Num-VLC1';

if (4<=Avg<8) select codeword table NumVLC2/Num-VLC2'; and if (8<=Avg) generate a 6 bit fixed length codeword (FLC) xxxxyy, where xxxx denotes the number of coefficients, and yy denotes T1.

In one embodiment, when Avg is =>8, and the number of coefficients for the current sample block is 0, the special codeword 000011 is used.

Continuing to refer to FIG. 2. Thereafter, i.e. upon selecting the VLC codeword table (or the FLC, in the case of a luma sample block), coding logic 124 proceeds to determine the number of coefficients and T1 for the current sample block, blocks 206-208. Then, logic 124 encodes the number of coefficients and T1 of the current sample block accordingly, using the selected VLC codeword table (or the FLC, in the case of a luma sample block).

Level Encoder Block

In various embodiments, Level encoder block 103 includes multiple VLC codeword tables for encoding levels of transform coefficients of luma as well as chroma sample blocks.

More specifically, in one embodiment, the multiple VLC codeword tables are "derived" from five (5) structured codeword tables, and the structured codeword tables are:

TABLE 9

Lev-VLC0

1
0 1
0 0 1
. . .
0 0 0 0 0 0 0 0 0 0 0 1
0 0 0 0 0 0 0 0 0 0 0 0 1 x x x x
0 0 0 0 0 0 0 0 0 0 0 0 0 1 x x x x x x x x x x x x

TABLE 10

Lev-VLC1

1 x
0 1 x
0 0 1 x
. . .
0 0 0 0 0 0 0 0 0 0 0 1 x
0 0 0 0 0 0 0 0 0 0 0 0 1 x x x x
0 0 0 0 0 0 0 0 0 0 0 0 0 1 x x x x x x x x x x x x

TABLE 11

Lev-VLC2

1 x x
0 1 x x
0 0 1 x x
. . .
0 0 0 0 0 0 0 0 0 0 0 1 x x
0 0 0 0 0 0 0 0 0 0 0 0 1 x x x x
0 0 0 0 0 0 0 0 0 0 0 0 0 1 x x x x x x x x x x x x

TABLE 12

Lev-VLC3

1 x x x
0 1 x x x
0 0 1 x x x
...
0 0 0 0 0 0 0 0 0 0 0 0 1 x x x
0 0 0 0 0 0 0 0 0 0 0 0 0 1 x x x x
0 0 0 0 0 0 0 0 0 0 0 0 0 0 1 x x x x x x x x x x x x

TABLE 13

Lev-VLC4

1 x x x x
0 1 x x x x
0 0 1 x x x x
...
0 0 0 0 0 0 0 0 0 0 0 0 0 1 x x x x
0 0 0 0 0 0 0 0 0 0 0 0 0 0 1 x x x x x x x x x x x x

The codewords in each VLC codeword table increase according to the number of leading zeros, and the string of xxx represents the order of possible combinations, e.g. for the codewords represented as 01xxxx, the codewords are 010000, 010001, 010010, ..., 011111.

Levels are assigned according to ascending code number pairs. Positive value of a Level receives the lower code number and negative value of a Level receives the higher code number of a code number pair.

The last two entries in each table can be considered escape codes. The first escape code, with four "x"'s, is used to code the 8 levels above the last regularly coded level. The next escape code, with 12 "x"'s, is used to code all remaining levels.

Generally, levels to be coded take values ±1, ±2 etc (Level). However, for the first coefficient to be coded (after T1es, processing from the back of a series of transform coefficients), if T1's<3 or Number of coefficients=T1's, levels to be coded may take values ±2, ±3 etc (Level'). Thus, if Lev-VLC0 or Lev-VLC1 is employed to encode the first coefficient (after T1's, processing from the back) the levels may start at ±2.

To illustrate, consider the following example "derived" VLC codeword tables, where a selection of codewords for each Lev-VLC table is listed.

| Code no. | Code | Level (±1, ±2 ...) | Level (±2, ±3 ...) |
|---|---|---|---|
| Lev-VLC0 | | | |
| 0 | 1 | 1 | 2 |
| 1 | 01 | -2 | -2 |
| 2 | 001 | 2 | 3 |
| 3 | 0001 | -2 | -3 |
| 4 | 00001 | 3 | 4 |
| ... | ... | ... | ... |
| 13 | 00000000000001 | -7 | -8 |
| 14 | 000000000000001xxxx | ±8 to ±15 | ±9 to ±16 |
| 15 | 000000000000001xxxxxxxxxxxx | ±16-> | ±17-> |
| Lev-VLC1 | | | |
| 0 | 10 | 1 | 2 |
| 1 | 11 | -1 | -2 |
| 2 | 010 | 2 | 3 |
| 3 | 011 | -2 | -3 |
| 4 | 0010 | 3 | 4 |
| 5 | 0011 | -3 | -4 |
| ... | ... | ... | ... |
| | 000000000000010 | 14 | 15 |
| | 000000000000011 | -14 | -15 |
| | 00000000000001xxxx | ±15 to ±22 | ±16 to ±23 |
| | 00000000000001xxxxxxxxxxxx | ±23-> | ±24-> |
| Lev-VLC2 | | | |
| 0 | 100 | 1 | |
| 1 | 101 | -1 | |
| 2 | 110 | 2 | |
| 3 | 111 | -2 | |
| 4 | 0100 | 3 | |
| 5 | 0101 | -3 | |
| 6 | 0110 | 4 | |
| 7 | 0111 | -4 | |
| 8 | 00100 | 5 | |
| ... | ... | ... | |
| | 0000000000000110 | 28 | |
| | 0000000000000111 | -28 | |
| | 000000000000001xxxx | ±28 to ±30 | |
| | 000000000000001xxxxxxxxxxxx | ±31-> | |
| Lev-VLC3 | | | |
| 0 | 1000 | 1 | |
| 1 | 1001 | -1 | |
| 2 | 1010 | 2 | |
| 3 | 1011 | -2 | |
| 4 | 1100 | 3 | |
| 5 | 1101 | -3 | |
| 6 | 1110 | 4 | |
| 7 | 1111 | -4 | |
| 8 | 01000 | 5 | |
| ... | ... | ... | |
| | 00000000000001110 | 56 | |
| | 00000000000001111 | -56 | |
| | 000000000000001xxxx | ±57 to ±64 | |
| | 000000000000001xxxxxxxxxxxx | ±65-> | |
| Lev-VLC4 | | | |
| 0 | 10000 | 1 | |
| 1 | 10001 | -1 | |
| 2 | 10010 | 2 | |
| 3 | 10011 | -2 | |
| ... | ... | ... | |
| | 11110 | 8 | |
| | 11111 | -8 | |
| | 010000 | 9 | |
| ... | ... | ... | |
| | 000000000000011110 | 120 | |
| | 000000000000011111 | -120 | |
| | 000000000000001xxxxxxxxxxxx | ±121-> | |

Figure 3:
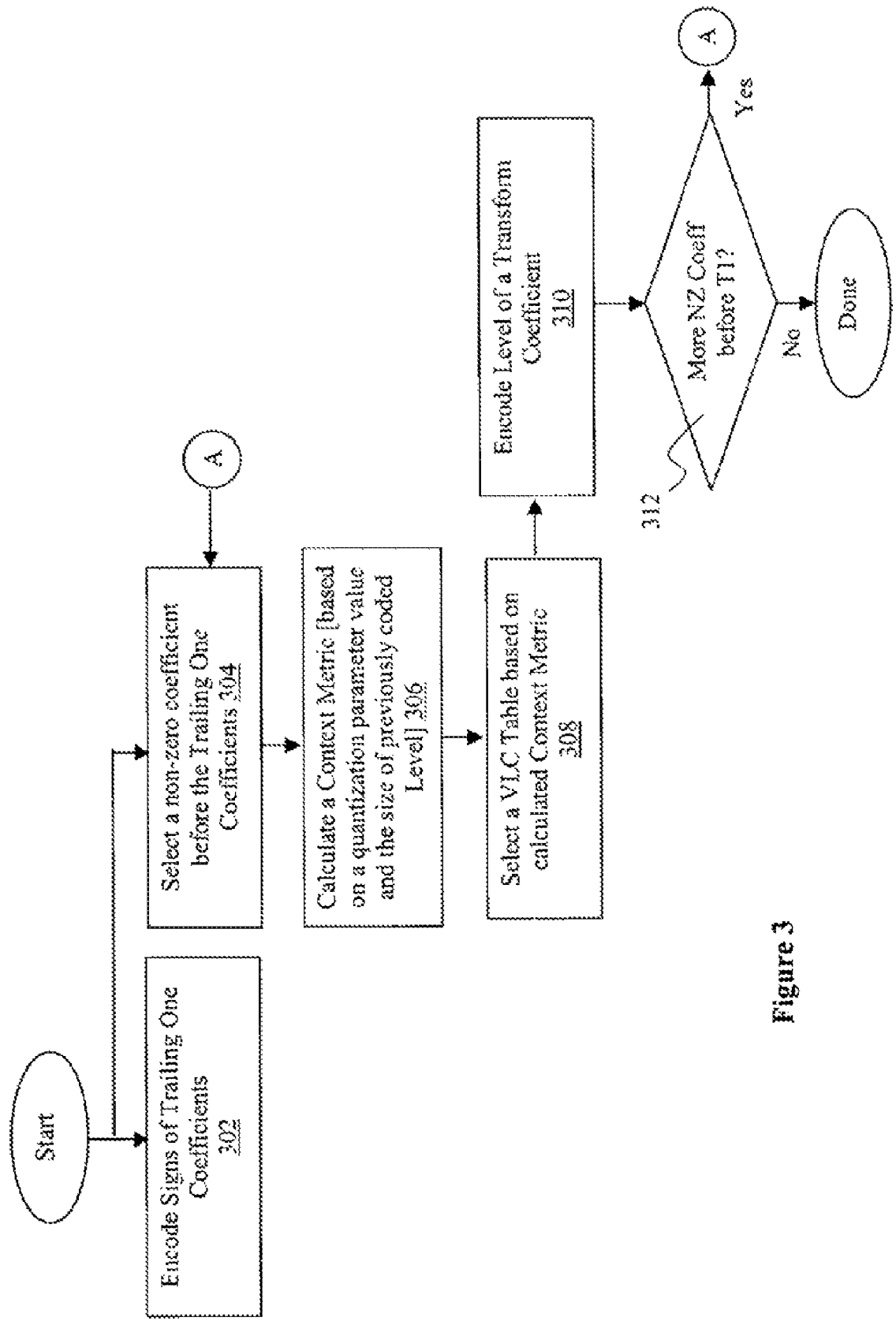
FIG. 3 illustrates the operational flow of the relevant aspects of the encoder block of FIG. 1 for encoding level measures of transform coefficients of (luma/chroma) blocks of a macroblock of a picture, in accordance with one embodiment.

FIG. 3 illustrates the operational flow of the relevant aspects of the Level encoder block of FIG. 1 for encoding level measures of transform coefficients of (luma/chroma) blocks of a macroblock of a picture, in accordance with one embodiment. As illustrated, for the embodiment, upon receipt of the transform coefficients of (luma/chroma) blocks, coding logic 134 of Level encoder block 104 first encodes the signs of us, block 302. For the embodiment, 1-bit is employed to encode each sign.

Additionally, coding logic 134 of Level encoder block 104 starts level coding with the first non-zero coefficient after T1's (processing from the back), block 304. For the embodiment, coding logic 134 of Level encoder block 104 computes a context metric to assist in the adaptive selection of an appropriate level VLC codeword table to perform the encoding, block 306. In various embodiments, the context metric is the quantization parameter value of the current macroblock, and the value is also provided in conjunction with the number of coefficients in the block, and the levels of the transform coefficients of the block.

In one embodiment, Level encoder block 104 selects the Level VLC codeword table as follows:

If Inter macroblock has any quantization parameter, or Intra macroblock bas a quantization parameter value

--- for the first coefficient, select Lev-VLC0,
    for the next coefficient, select Lev-VLC1, and
        thereafter, if the absolute value of Level is > 3,
        select the next "higher"
        Lev-VLCx codeword table,
            up to 2 codeword tables "higher";

---

If Intra macroblock has a quantization parameter value <9,

--- if (number of coefficients > 10)
    for the first coefficient, select Lev-VLC1,
        for the next coefficient, select Lev-VLC2,
else
    for the first coefficient, select Lev-VLC0,
        for the next coefficient, select Lev-VLC1,
            thereafter, if the absolute value of Level is > 3 and the VLC
            codeword table is Lev-VLC1, select Lev-VLC2,

--- if the absolute value of Level is > 5 and the VLC codeword table is >= Lev-VLC2, select the next "higher" Lev-VLCx codeword table, up to 4 codeword tables "higher".

---

Continuing to refer to FIG. 3, upon selecting the appropriate VLC codeword table, coding logic 134 encodes the level of the current non-zero transform coefficient to be coded, block 310.

Next, coding logic 134 determines if all non-zero coefficients before the T1 coefficients have all been level coded, block 312. If not, coding logic 134 continues operation at block 304 as earlier described. If all non-zero coefficients before the T1 coefficients have been level coded, coding logic 134 terminates the level coding process for the current sample block.

Total Zeros and Run Length Encoder Blocks

In various embodiments, TotalZero-RunLength encoder block 106 includes multiple VLC codeword tables for encoding the number of zero coefficients interposed among and the non-zero coefficients and their respective run lengths.

More specifically, in one embodiment, TotalZero-RunLength encoder block 106 includes two VLC codeword tables for encoding "total zeros", one for transform coefficients of luma sample blocks and another for transform coefficients of chroma sample blocks, and a VLC codeword table for encoding "run lengths" for either type of sample blocks. The VLC codeword tables are:

TABLE 14

Luma Total Zeros VLC Codeword Table

| NumCoeff TotZeros | 1 | 2 | 3 | 4 | 5 | 6 | 7 |
|---|---|---|---|---|---|---|---|
| 0 | 1 | 111 | 0010 | 111101 | 01000 | 101100 | 111000 |
| 1 | 011 | 101 | 1110 | 1101 | 1110 | 01010 | 101101 | 111001 |
| 2 | 010 | 011 | 000 | 0110 | 01011 | 1010 | 11101 |
| 3 | 0011 | 001 | 010 | 1010 | 1110 | 001 | 1001 |
| 4 | 0010 | 000 | 1011 | 000 | 011 | 010 | 1111 |
| 5 | 00011 | 1000 | 1111 | 100 | 100 | 000 | 00 |
| 6 | 00010 | 0101 | 011 | 110 | 1111 | 110 | 01 |
| 7 | 000011 | 1001 | 100 | 1011 | 110 | 111 | 101 |
| 8 | 000010 | 1100 | 0011 | 010 | 101 | 100 | 110 |
| 9 | 0000011 | 01000 | 1110 | 001 | 001 | 011 | 100 |
| 10 | 0000010 | 11011 | 1010 | 0111 | 000 | 10111 | — |
| 11 | 00000001 | 11010 | 11000 | 1111 | 01001 | — | — |
| 12 | 00000000 | 010010 | 110011 | 111100 | — | — | — |
| 13 | 00000011 | 0100111 | 110010 | — | — | — | — |
| 14 | 000000101 | 0100110 | — | — | — | — | — |
| 15 | 000000100 | — | — | — | — | — | — |

| NumCoeff TotZeros | 8 | 9 | 10 | 11 | 12 | 13 | 14 | 15 |
|---|---|---|---|---|---|---|---|---|
| 0 | 101000 | 111000 | 10000 | 11000 | 1000 | 100 | 00 | 0 |
| 1 | 101001 | 111001 | 10001 | 11001 | 1001 | 101 | 01 | 1 |
| 2 | 10101 | 11101 | 1001 | 1101 | 101 | 11 | 1 | — |
| 3 | 1011 | 1111 | 101 | 111 | 0 | 0 | — | — |
| 4 | 110 | 00 | 01 | 0 | 11 | — | — | — |
| 5 | 00 | 01 | 11 | 10 | — | — | — | — |
| 6 | 111 | 10 | 00 | — | — | — | — | — |
| 7 | 01 | 110 | — | — | — | — | — | — |
| 8 | 100 | — | — | — | — | — | — | — |
| 9 | — | — | — | — | — | — | — | — |
| 10 | — | — | — | — | — | — | — | — |
| 11 | — | — | — | — | — | — | — | — |
| 12 | — | — | — | — | — | — | — | — |
| 13 | — | — | — | — | — | — | — | — |
| 14 | — | — | — | — | — | — | — | — |
| 15 | — | — | — | — | — | — | — | — |

TABLE 15

Chroma Total Zeros VLC Codeword Table

| TotZeros | NumCoeff | | |
|---|---|---|---|
| | 1 | 2 | 3 |
| 0 | 1 | 1 | 1 |
| 1 | 01 | 01 | 0 |
| 2 | 001 | 00 | — |
| 3 | 000 | — | — |

TABLE 16

Run Length VLC Codeword Table

| ZerosLeft Run Length | 1 | 2 | 3 | 4 | 5 | 6 | >6 |
|---|---|---|---|---|---|---|---|
| 0 | 1 | 1 | 01 | 01 | 01 | 01 | 000 |
| 1 | 0 | 01 | 00 | 00 | 00 | 00 | 010 |
| 2 | — | 00 | 11 | 11 | 11 | 101 | 101 |
| 3 | — | — | 10 | 101 | 101 | 100 | 100 |
| 4 | — | — | — | 100 | 1001 | 111 | 111 |
| 5 | — | — | — | — | 1000 | 1101 | 110 |
| 6 | — | — | — | — | — | 1100 | 0011 |
| 7 | — | — | — | — | — | — | 0010 |
| 8 | — | — | — | — | — | — | 00011 |
| 9 | — | — | — | — | — | — | 00010 |
| 10 | — | — | — | — | — | — | 00001 |
| 11 | — | — | — | — | — | — | 0000011 |
| 12 | — | — | — | — | — | — | 0000010 |
| 13 | — | — | — | — | — | — | 0000001 |
| 14 | — | — | — | — | — | — | 00000001 |

Similarly, in alternate embodiments, different number of VLC codeword tables as well as different VLC codewords, including different manner of storing the VLC codewords, may be used to practice the present invention. In particular, in one embodiment, the present invention may be practiced with the following three VLC codeword tables instead.

TABLE 14

Luma Total Zeros VLC Codeword Table

| NumCoeff TotZeros | 1 | 2 | 3 | 4 | 5 | 6 | 7 |
|---|---|---|---|---|---|---|---|
| 0 | 11 | 1113 | 1014 | 0115 | 1014 | 0016 | 0016 |
| 1 | 0113 | 1103 | 1113 | 1113 | 1004 | 0015 | 0015 |
| 2 | 0103 | 1013 | 1103 | 1014 | 0114 | 1113 | 1013 |
| 3 | 0114 | 1003 | 1013 | 1004 | 1113 | 1103 | 1003 |
| 4 | 0104 | 0113 | 1004 | 1103 | 1103 | 1013 | 0113 |
| 5 | 0115 | 1014 | 0114 | 1013 | 1013 | 1003 | 112 |
| 6 | 0105 | 1004 | 1003 | 1003 | 1003 | 0113 | 0103 |
| 7 | 0116 | 0114 | 0113 | 0114 | 0113 | 0103 | 0014 |
| 8 | 0106 | 0104 | 0104 | 0113 | 0104 | 0014 | 0013 |
| 9 | 0117 | 0115 | 0115 | 0104 | 0015 | 0013 | 0006 |
| 10 | 0107 | 0105 | 0105 | 0105 | 0014 | 0006 | — |
| 11 | 0118 | 0116 | 0016 | 0015 | 0005 | — | — |
| 12 | 0108 | 0106 | 0015 | 0005 | — | — | — |
| 13 | 0119 | 0016 | 0006 | — | — | — | — |
| 14 | 0109 | 0006 | — | — | — | — | — |
| 15 | 0019 | — | — | — | — | — | — |

| NumCoeff TotZeros | 8 | 9 | 10 | 11 | 12 | 13 | 14 | 15 |
|---|---|---|---|---|---|---|---|---|
| 0 | 0016 | 0016 | 0015 | 0004 | 0004 | 0003 | 002 | 01 |
| 1 | 0014 | 0006 | 0005 | 0014 | 0014 | 0013 | 012 | 11 |
| 2 | 0015 | 0014 | 0013 | 0013 | 012 | 11 | 11 | — |
| 3 | 0113 | 112 | 112 | 0103 | 11 | 012 | — | — |
| 4 | 112 | 102 | 102 | 11 | 0013 | — | — | — |
| 5 | 102 | 0013 | 012 | 0113 | — | — | — | — |
| 6 | 0103 | 012 | 0014 | — | — | — | — | — |

TABLE 14-continued

Luma Total Zeros VLC Codeword Table

| | | | | | | | | |
|---|---|---|---|---|---|---|---|---|
| 7 | 0013 | 0015 | — | — | — | — | — | — |
| 8 | 0006 | — | — | — | — | — | — | — |
| 9 | — | — | — | — | — | — | — | — |
| 10 | — | — | — | — | — | — | — | — |
| 11 | — | — | — | — | — | — | — | — |
| 12 | — | — | — | — | — | — | — | — |
| 13 | — | — | — | — | — | — | — | — |
| 14 | — | — | — | — | — | — | — | — |
| 15 | — | — | — | — | — | — | — | — |

TABLE 15

Chroma Total Zeros VLC Codeword Table

| TotZeros | NumCoeff | | |
|---|---|---|---|
| | 1 | 2 | 3 |
| 0 | 1 1 | 1 1 | 1 1 |
| 1 | 01 2 | 01 2 | 0 1 |
| 2 | 01 3 | 00 2 | — |
| 3 | 00 3 | — | — |

TABLE 16

Run Length VLC Codeword Table

| ZerosLeft RunLength | 1 | 2 | 3 | 4 | 5 | 6 | >6 |
|---|---|---|---|---|---|---|---|
| 0 | 1 | 1 | 11 | 11 | 11 | 11 | 111 3 |
| 1 | 0 | 01 | 10 | 10 | 10 | 000 | 110 3 |
| 2 | — | 00 | 01 | 01 | 011 | 001 | 101 3 |
| 3 | — | — | 00 | 001 | 010 | 011 | 100 3 |
| 4 | — | — | — | 000 | 001 | 010 | 011 3 |
| 5 | — | — | — | — | 000 | 101 | 010 3 |
| 6 | — | — | — | — | — | 100 | 001 3 |
| 7 | — | — | — | — | — | — | 001 4 |
| 8 | — | — | — | — | — | — | 001 5 |
| 9 | — | — | — | — | — | — | 001 6 |
| 10 | — | — | — | — | — | — | 001 7 |
| 11 | — | — | — | — | — | — | 001 8 |
| 12 | — | — | — | — | — | — | 001 9 |
| 13 | — | — | — | — | — | — | 001 10 |
| 14 | — | — | — | — | — | — | 001 11 |

The VLC codewords of Tables 14-16 are expressed in the same earlier described space saving format.

Figure 4:
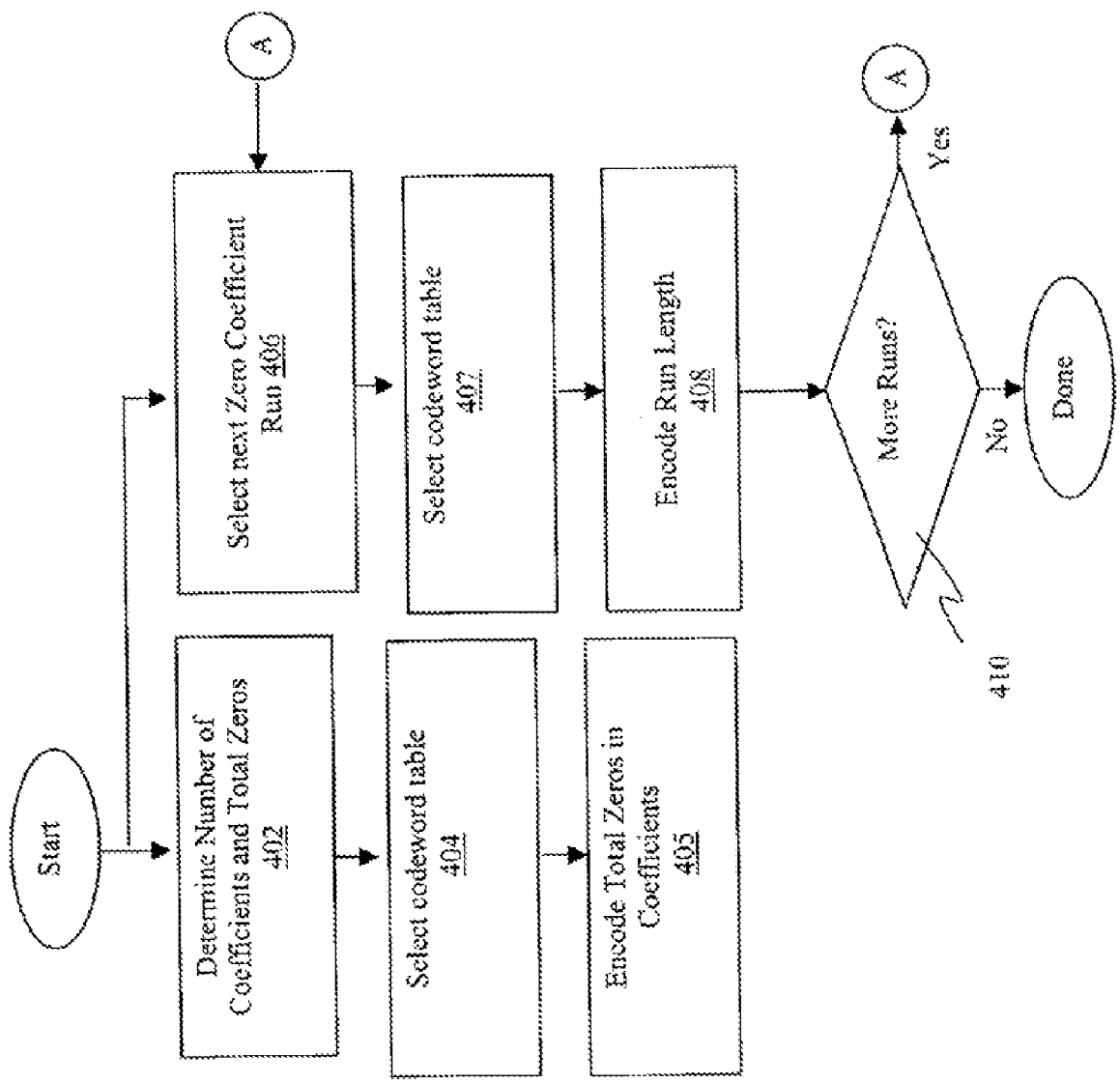
FIG. 4 illustrates the operational flow of the relevant aspects of the encoder block of FIG. 1 for encoding number of zero coefficients interposed among non-zero coefficients and their respective run lengths of transform coefficients of (luma/chroma) blocks of a macroblock of a picture, in accordance with one embodiment.

FIG. 4 illustrates the operational flow of the relevant aspects of coding logic 144 of TotalZero-Run Length encoder block 142 for encoding number of zero coefficients interposed among non-zero coefficients and their respective run lengths of transform coefficients of (luma/chroma) blocks of a macroblock of a picture, in accordance with one embodiment.

As illustrated, for the embodiment, upon receipt of the transform coefficients of (luma/chroma) blocks, coding logic 144 determines the number of zero coefficients interposed among the non-zero coefficients (Total Zeros), block 402. Next, coding logic 144 selects the appropriate codeword table corresponding to the number of coefficients in the block and the sample block type, block 404. In other embodiments, other criteria may be used to select the codeword table. Next, coding logic 144 encodes the Total Zeros information using the selected codeword table.

Additionally, coding logic 144 selects the first run of the interposed zeros (processing from the back, or in an alterative embodiment, processing from the front), and determines the run length (Run Length), blocks 406-408. Next, coding logic 144 selects the appropriate codeword table based on the number of zeros left to be interposed, block 407. Next, coding logic 144 encodes the Run Length information using the selected Run Length codeword table. Coding logic 144 then determines if all interposed zero runs have been coded, block 410. If not, coding logic 144 continues back at block 406 as earlier described. If all interposed zero runs have been coded, the Total Zero and Run Length encoding process terminates.

Decoder

Figure 5:
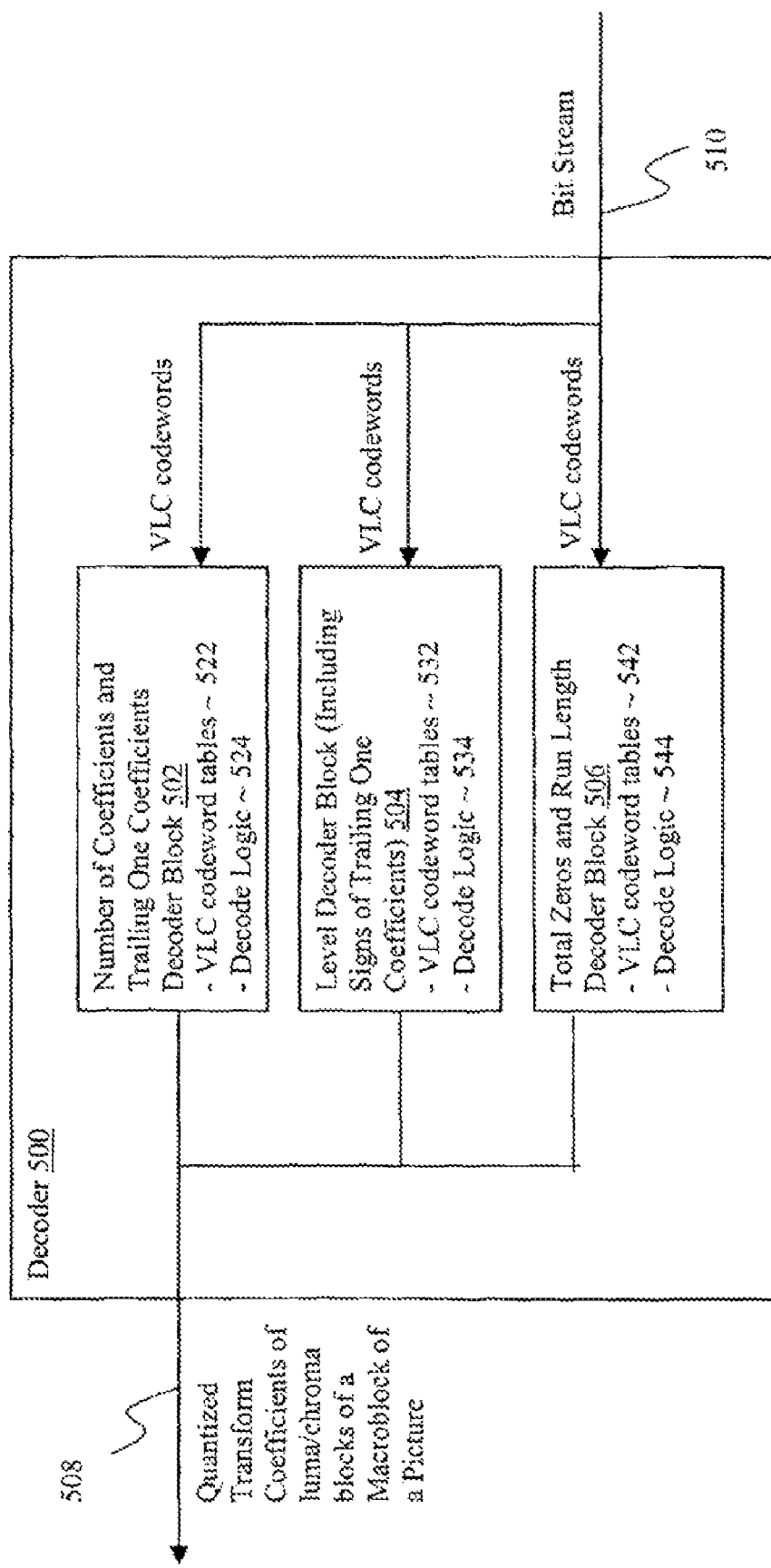
FIG. 5 illustrates an overview of a context-adaptive VLC decoder of the present invention for decoding transform coefficients encoded in accordance with encoding principles similar to that of the encoder of FIG. 1, in accordance with one embodiment.

FIG. 5 illustrates an overview of a context-adaptive VLC decoder of the present invention for decoding transform coefficients encoded in accordance with encoding principles similar to that of the encoder of FIG. 1, in accordance with one embodiment. As illustrated, for the embodiment, context-adaptive VLC decoder 500 is similarly constituted as encoder 100, having decoder blocks 502-506, which are coupled to input 510 of decoder 500 in parallel to receive a bit stream of VLC codewords encoding quantized transform coefficients of (luma/chroma) blocks of macroblocks of pictures of a video. In response, decoder blocks 502-506 decode the received encodings of the transform coefficients of the (luma/chroma) blocks back into their quantized forms, and output them at output 108.

For the embodiments, decoder blocks 502-506 are similar constituted as encoder blocks 102-106. That is, decoder block 502 includes VLC codeword tables 522 and coding logic 524 for decoding combined VLC codewords of the number of coefficients and T1 coefficients in a series of transform coefficients of (luma/chroma) blocks of a macroblock of a picture. Further, decoder block 504 includes VLC codeword tables 532 and coding logic 534 for decoding VLC codewords of the levels of transform coefficients of the (luma/chroma) blocks. Similarly, decoder block 506 includes VLC codeword tables 532 and coding logic 534 for decoding VLC codewords of the Total Zeros and the respective "Zero" Run Lengths in the non-zero transform coefficients of the (luma/chroma) blocks.

Example Applications of the Present Invention

Figure 6:
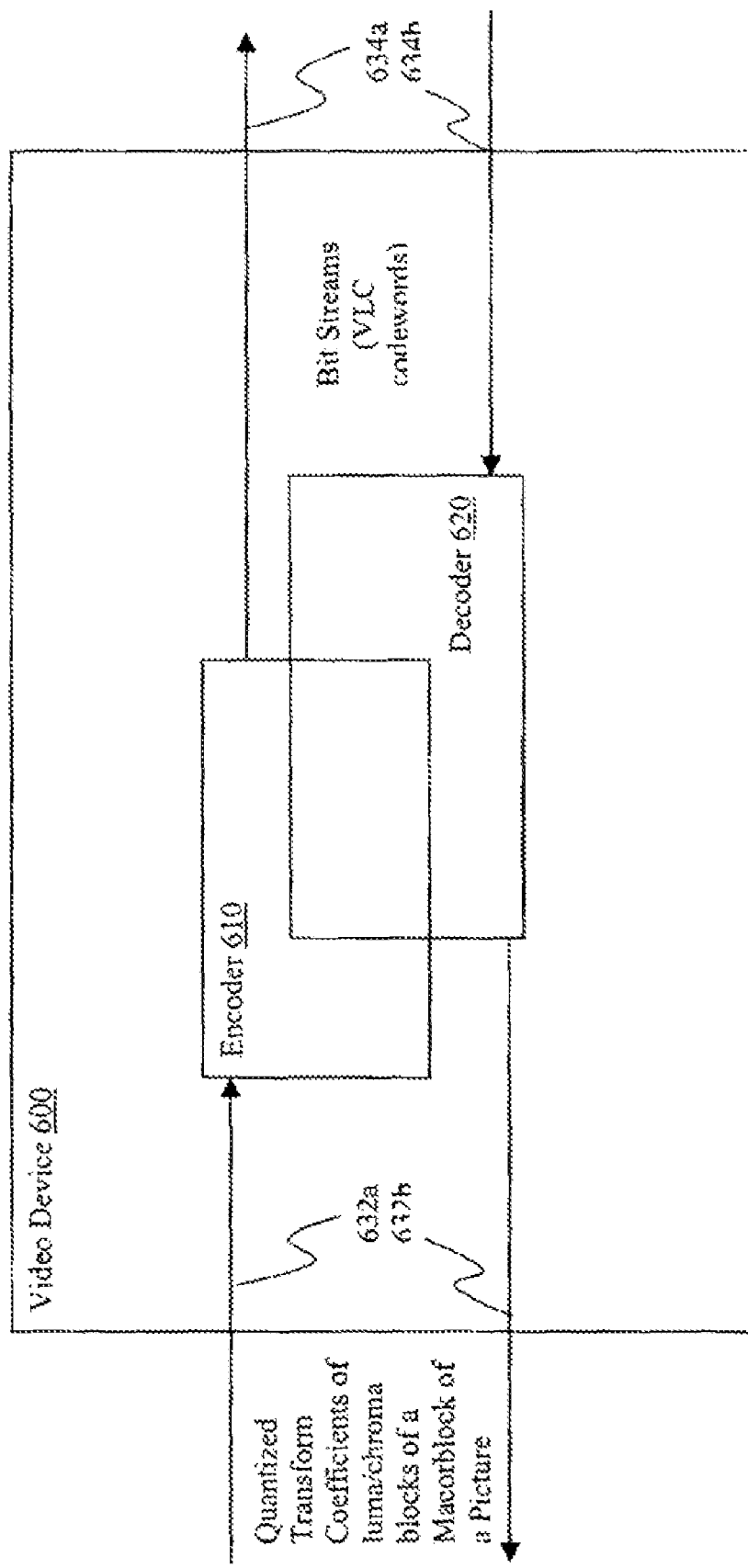
FIG. 6 illustrates a video device having an encoder and a decoder incorporated with the encoding/decoding teachings of the present invention, in accordance with one embodiment.

FIG. 6 illustrates a video device incorporated with the teachings of the present invention, in accordance with one embodiment. As illustrated, video device 600 includes encoder 610 and decoder 620 coupled to the inputs and outputs of the device. As described earlier, encoder 610 is designed to receive quantized transform coefficients 632a of (luma/chroma) blocks of macroblocks of pictures of a video, and to adaptively encode them in response, into VLC codewords 634a. Decoder 620 is designed to receive VLC codewords 634b of the transform coefficients of (luma/chroma) blocks of macroblocks of pictures of another video, and to adaptively decode in response the codewords back into coefficients 632b.

Encoder 610 and decoder 620 are similarly constituted as the earlier described encoder 100 and decoder 500. In various embodiments, encoder 610 and decoder 620 may share at least in part their constituting tables and coding logics (as denoted by the intersecting blocks of encoder 610 and decoder 620).

In various embodiments, video device 600 may be a digital camera, a DVD player, a video surveillance camera, a video conferencing device, a medical imaging device, and other video devices of the like. In other embodiment, video device 600 may be a wireless mobile phone, a palm sized computing device, such as a personal digital assistant, a laptop computing device, a desktop computing device, a set top box, a server, and other computing devices of the like. Applications executing one these video devices 600 may include instant messaging and/or email that includes video. In yet other embodiments, video device 600 may be a circuit board component, such as a video "add-on" circuit board (also referred to as a daughter circuit board), a motherboard, and other circuit boards of the like.

Figure 7:
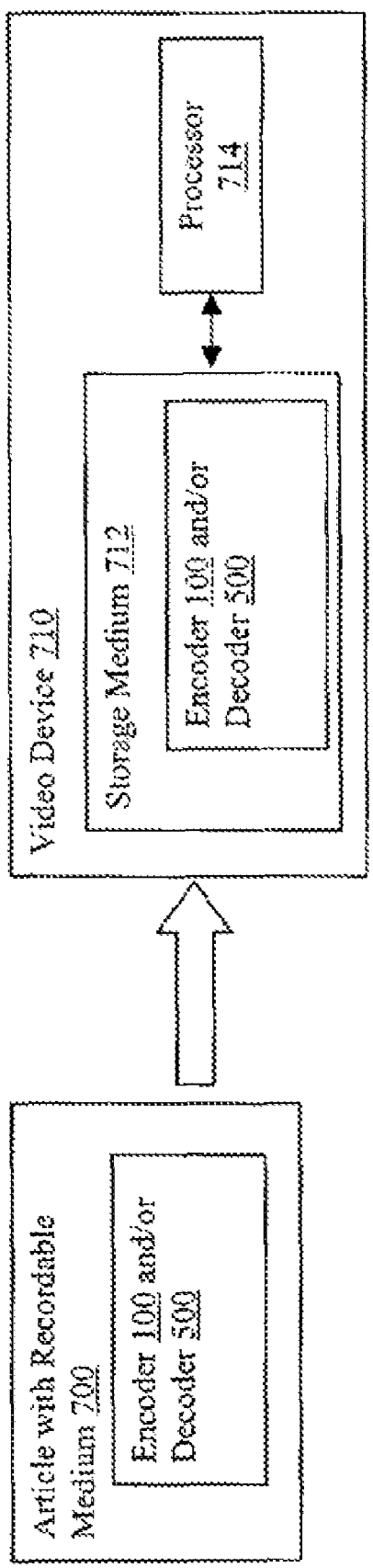
FIG. 7 illustrates an article of manufacture with a recordable medium having a software implementation of the encoder/decoder of the present invention, designed for use to program a device to equip the device with the encoding/decoding capability of the present invention, in accordance with one embodiment.

FIG. 7 illustrates an article of manufacture including a recordable medium 700 having programming instructions implementing a software embodiment of the earlier described encoder 100 and/or decoder 500. Programming instructions implementing a software embodiment of encoder 100 and/or decoder 500 are designed for use to program video device 710 to equip video device 710 with the encoding and decoding capabilities of the present invention.

For the embodiment, video device 710 include storage medium 712 to store at least a portion of a working copying of the programming instructions implementing the software embodiment of encoder 100 and/or decoder 500, and at least one processor 714 coupled to storage medium 712 to execute the programming instructions.

Video device 710 may be anyone of the earlier enumerated example devices or other video devices of the like. Article 700 may e.g. be a diskette, a compact disk (CD), a DVD or other computer readable medium of the like. In other embodiments, article 700 may be a distribution server distributing encoder 100 and/or decoder 500 on line, via private and/or public networks, such as the Internet. In one embodiment, article 700 is a web server.

Figure 8:
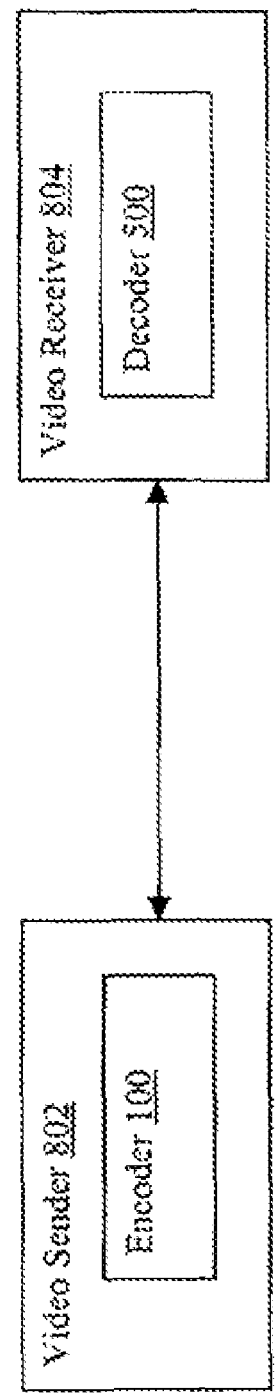
FIG. 8 illustrates a system having a video sender device and a video receiver device incorporated with the encoding/decoding teachings of the present invention, in accordance with one embodiment.

FIG. 8 illustrates an example system having video sender 802 and video receiver 804 communicatively coupled to each other as shown, with video sender 802 encoding a video in accordance with the teachings of the present invention, and providing the encoded video to video receiver 802, and video receiver 802, in turn decoding the encoded video to render the video. Video sender 802 and video receiver 804 are equipped with the earlier described encoder 100 and decoder 500 respectively.

An example of video sender 802 is a video sewer, whereas an example of a video receiver 804 is a client device coupled to video sender 802.

CONCLUSION AND EPILOGUE

Thus, it can be seen from the above descriptions, a novel method for encoding and decoding transform coefficients of (luma/chroma) blocks of a macroblock of a picture, including encoders, decoders, devices and systems incorporated with the method have been described.

While the present invention has been described in terms of the foregoing embodiments and example applications, those skilled in the art will recognize that the invention is not limited to the embodiments and example application described. The present invention can be practiced with modification and alteration within the spirit and scope of the appended claims. For examples, different number of encoder/decoder blocks, different number of codeword tables in the various encoder/decoder blocks, different codeword tables, different codeword table selection logic, and different coding directions may be practiced instead.

Thus, the description is to he regarded as illustrative instead of restrictive on the present invention.

What is claimed is:

1. An apparatus comprising:

storage medium; and a plurality of codeword tables stored in said storage medium, with each of said codeword tables having a plurality of codewords to be adaptively accessed to perform at least one of:

encoding a level measure of a transform coefficient of a sample block of a macroblock of a picture, with said encoding being independent of encoding of a number of coefficients of the transform coefficients of the sample block; and decoding an encoding of a level measure of a transform coefficient of a sample block of a macroblock of a picture, with said encoding being independent of a number of coefficients of the transform coefficients of the sample block.

2. The apparatus of claim 1, wherein the transform coefficient of a sample block of a macroblock of a picture comprises a transform coefficient of a selected one of a luma sample block and a chroma sample block of a macroblock of a picture.

3. The apparatus of claim 1, wherein the codeword tables comprise at least one codeword table having a majority of the codewords of a selected one of

---

1
01
001
...
00000000000001
000000000000001xxxx
0000000000000001xxxxxxxxxxxx
1x
01x
001x
...
00000000000001x
000000000000001xxxx
0000000000000001xxxxxxxxxxxx
1xx
01xx
001xx
...
00000000000001xx
000000000000001xxxx
0000000000000001xxxxxxxxxxxx
1xxx
01xxx
001xxx
...
00000000000001xxx
000000000000001xxxx
0000000000000001xxxxxxxxxxxx
1xxxx
01xxxx
001xxxx
...
000000000000001xxxx
0000000000000001xxxxxxxxxxxx.

---

4. The apparatus of claim 1, wherein the apparatus further comprises logic coupled to the storage medium to adaptively select one of said codeword tables to encode/decode a level measure of a transform coefficient of a sample block of a macroblock of a picture, based at least in part on one or more of a quantization parameter of the macroblock, the number of coefficients in the block, and the level of one or more of the previously encoded/decoded transform coefficients.

5. The apparatus of claim 4, wherein:

the codeword tables comprise different numbers of codewords; and the logic is equipped to encode/decode transform coefficients, symmetrically selecting smaller codeword tables before selecting larger codeword tables.

6. The apparatus of claim 4, wherein logic is equipped to process the transform coefficients in a selected one of a back to front processing order and a front to back processing order.

7. The apparatus of claim 1, wherein the apparatus further comprises logic to perform at least one of:

encoding signs of trailing one coefficients of a series of transform coefficients of sample blocks of a macroblock of a picture; and decoding encodings of signs of trailing one coefficients of a series of transform coefficients of sample blocks of a macroblock of a picture.

8. The apparatus of claim 1, wherein the apparatus further comprises a processor coupled to the storage medium to selectively access said codewords of said codeword tables to perform said encoding/decoding.

9. The apparatus of claim 1, wherein the apparatus comprises a selected one of a palm sized computing device, a wireless mobile phone, a digital personal assistant, a laptop computing device, a desktop computing device, a set-top box, a server, a compact disk player, a digital versatile disk player, a television, and a display monitor.

10. The apparatus of claim 1, wherein the apparatus comprises a video daughter card and a motherboard having integrated video capability.

11. An apparatus comprising:

storage medium; and a plurality of codeword tables stored in said storage medium, with each of said codeword tables having a plurality of codewords to be selectively accessed, based at least in part on a sample block type, to perform at least one of:

encoding a total count of zero coefficients interposed between non-zero coefficients of a series of transform coefficients of sample blocks of a macroblock of a picture, and one or more run lengths of the zero coefficients before the respective non-zero coefficients;

decoding an encoding of a total count of zero coefficients interposed between non-zero coefficients of a series of transform coefficients of sample blocks of a macroblock of a picture, and one or more run lengths of the zero coefficients before the respective nonzero coefficients.

12. The apparatus of claim 11, wherein the codeword tables comprise a codeword table with a plurality of codewords to encode/decode a total count of zero coefficients interposed between non-zero coefficients of a series of transform coefficients of luma sample blocks of a macroblock of a picture.

13. The apparatus of claim 12, wherein the codeword tables comprise a codeword table having a majority of the codewords of

| NumCoeff TotZeros | 1 | 2 | 3 | 4 | 5 | 6 | 7 |
|---|---|---|---|---|---|---|---|
| 0 | 1 1 | 111 3 | 101 4 | 011 5 | 101 4 | 001 6 | 001 6 |
| 1 | 011 3 | 110 3 | 111 3 | 111 3 | 100 4 | 001 5 | 001 5 |
| 2 | 010 3 | 101 3 | 110 3 | 101 4 | 011 4 | 111 3 | 101 3 |
| 3 | 011 4 | 100 3 | 101 3 | 100 4 | 111 3 | 110 3 | 100 3 |
| 4 | 010 4 | 011 3 | 100 4 | 110 3 | 110 3 | 101 3 | 011 3 |
| 5 | 011 5 | 101 4 | 011 4 | 101 3 | 101 3 | 100 3 | 11 2 |

-continued

| NumCoeff TotZeros | | | | | | | |
|---|---|---|---|---|---|---|---|
| 6 | 010 5 | 100 4 | 100 3 | 100 3 | 100 3 | 011 3 | 010 3 |
| 7 | 011 6 | 011 4 | 011 3 | 011 4 | 011 3 | 010 3 | 001 4 |
| 8 | 010 6 | 010 4 | 010 4 | 011 3 | 010 4 | 001 4 | 001 3 |
| 9 | 011 7 | 011 5 | 011 5 | 010 4 | 001 5 | 001 3 | 000 6 |
| 10 | 010 7 | 010 5 | 010 5 | 010 5 | 001 4 | 000 6 | — |
| 11 | 011 8 | 011 6 | 001 6 | 001 5 | 000 5 | — | — |
| 12 | 010 8 | 010 6 | 001 5 | 000 5 | — | — | — |
| 13 | 011 9 | 001 6 | 000 6 | — | — | — | — |
| 14 | 010 9 | 000 6 | — | — | — | — | — |
| 15 | 001 9 | — | — | — | — | — | — |

| NumCoeff TotZeros | 8 | 9 | 10 | 11 | 12 | 13 | 14 | 15 |
|---|---|---|---|---|---|---|---|---|
| 0 | 001 6 | 001 6 | 001 5 | 000 4 | 000 4 | 000 3 | 00 2 | 0 1 |
| 1 | 001 4 | 000 6 | 000 5 | 001 4 | 001 4 | 001 3 | 01 2 | 1 1 |
| 2 | 001 5 | 001 4 | 001 3 | 001 3 | 01 2 | 1 1 | 1 1 | — |
| 3 | 011 3 | 11 2 | 11 2 | 010 3 | 1 1 | 01 2 | — | — |
| 4 | 11 2 | 10 2 | 10 2 | 1 1 | 001 3 | — | — | — |
| 5 | 10 2 | 001 3 | 01 2 | 011 3 | — | — | — | — |
| 6 | 010 3 | 01 2 | 001 4 | — | — | — | — | — |
| 7 | 001 3 | 001 5 | — | — | — | — | — | — |
| 8 | 000 6 | — | — | — | — | — | — | — |
| 9 | — | — | — | — | — | — | — | — |
| 10 | — | — | — | — | — | — | — | — |
| 11 | — | — | — | — | — | — | — | — |
| 12 | — | — | — | — | — | — | — | — |
| 13 | — | — | — | — | — | — | — | — |
| 14 | — | — | — | — | — | — | — | — |
| 15 | — | — | — | — | — | — | — | — |

14. The apparatus of claim 11, wherein the codeword tables comprise a codeword table with a plurality of codewords to encode/decode a total count of zero coefficients interposed between non-zero coefficients of a series of transform coefficients of chroma sample blocks of a macroblock of a picture.

15. The apparatus of claim 14, wherein the codeword tables comprise a codeword table having a majority of the codewords of

| NumCoeff TotZeros | 1 | 2 | 3 |
|---|---|---|---|
| 0 | 1 1 | 1 1 | 1 1 |
| 1 | 01 2 | 01 2 | 0 1 |
| 2 | 01 3 | 00 2 | — |
| 3 | 00 3 | — | —. |

16. The apparatus of claim 11, wherein the codeword tables comprise a codeword table with a plurality of codewords to encode/decode the one or more run lengths of the zero coefficients before the respective non-zero coefficients of a series of transform coefficients of sample blocks of a macroblock of a picture.

17. The apparatus of claim 16, wherein the codeword tables comprise at least one codeword table having a majority of the codewords of

| ZerosLeft RunLength | 1 | 2 | 3 | 4 | 5 | 6 | >6 |
|---|---|---|---|---|---|---|---|
| 0 | 1 | 1 | 11 | 11 | 11 | 11 | 111 3 |
| 1 | 0 | 01 | 10 | 10 | 10 | 000 | 110 3 |
| 2 | — | 00 | 01 | 01 | 011 | 001 | 101 3 |
| 3 | — | — | 00 | 001 | 010 | 011 | 100 3 |
| 4 | — | — | — | 000 | 001 | 010 | 011 3 |
| 5 | — | — | — | — | 000 | 101 | 010 3 |
| 6 | — | — | — | — | — | 100 | 001 3 |
| 7 | — | — | — | — | — | — | 001 4 |
| 8 | — | — | — | — | — | — | 001 5 |
| 9 | — | — | — | — | — | — | 001 6 |
| 10 | — | — | — | — | — | — | 001 7 |
| 11 | — | — | — | — | — | — | 001 8 |
| 12 | — | — | — | — | — | — | 001 9 |
| 13 | — | — | — | — | — | — | 001 10 |
| 14 | — | — | — | — | — | — | 001 11. |

18. The apparatus of claim 11, wherein the apparatus further comprises a processor coupled to the storage medium to selectively access said codewords of said codeword tables to perform said encoding/decoding.

19. The apparatus of claim 11, wherein the apparatus comprises a selected one of a palm sized computing device, a wireless mobile phone, a digital personal assistant, a laptop computing device, a desktop computing device, a set-top box, a server, a compact disk player, a digital versatile disk player, a television, and a display monitor.

20. The apparatus of claim 11, wherein the apparatus comprises a video daughter card and a motherboard having integrated video capability.

21. A computer-readable storage medium comprising:

a plurality of codeword tables recorded on the computer-readable storage medium to be retrieved to program an apparatus, with each of said plurality of codeword tables having a plurality of codewords to enable an encoding logic or a decoding logic to selectively access the codewords to perform at least one of:

encoding in a combined manner, a number of coefficients and a number of trailing one coefficients in a series of transform coefficients of sample blocks of a macroblock of a picture; and decoding a combined encoding of a number of coefficients and a number of trailing one coefficients in a series of transform coefficients of sample blocks of a macroblock of a picture.

22. The computer-readable medium of claim 21, wherein the codeword tables comprise at least a codeword table having a majority of the codewords of a selected one of

| | 0 | 1 | 2 | 3 |
|---|---|---|---|---|
| T1s NumCfeff | | | | |
| 0 | 1 1 | — | — | — |
| 1 | 0101 6 | 01 2 | — | — |
| 2 | 0111 8 | 0100 6 | 0001 3 | — |
| 3 | 0111 9 | 0110 8 | 0101 7 | 0011 5 |
| 4 | 0111 10 | 0110 9 | 0101 8 | 0011 6 |
| 5 | 0111 11 | 0110 10 | 0101 9 | 0100 7 |
| 6 | 1111 13 | 0110 11 | 0101 10 | 0100 8 |
| 7 | 1011 13 | 1110 13 | 0101 11 | 0100 9 |
| 8 | 1000 13 | 1010 13 | 1101 13 | 0100 10 |
| 9 | 1111 14 | 1110 14 | 1001 13 | 0100 11 |
| 10 | 1011 14 | 1010 14 | 1101 14 | 1100 13 |
| 11 | 1111 15 | 1110 15 | 1001 14 | 1100 14 |
| 12 | 1011 15 | 1010 15 | 1101 15 | 1000 14 |
| 13 | 1111 16 | 0001 15 | 1001 15 | 1100 15 |

-continued

|    | 0       | 1       | 2       | 3       |
|----|---------|---------|---------|---------|
| 14 | 1011 16 | 1110 16 | 1101 16 | 1000 15 |
| 15 | 0111 16 | 1010 16 | 1001 16 | 1100 16 |
| 16 | 0100 16 | 0110 16 | 0101 16 | 1000 16 |

T1s
NumCoeff

|    | 0       | 1       | 2       | 3       |
|----|---------|---------|---------|---------|
| 0  | 11 2    | —       | —       | —       |
| 1  | 1011 6  | 10 2    | —       | —       |
| 2  | 0111 6  | 0111 5  | 011 3   | —       |
| 3  | 0111 7  | 1010 6  | 1001 6  | 0101 4  |
| 4  | 0111 8  | 0110 6  | 0101 6  | 0100 4  |
| 5  | 0100 8  | 0110 7  | 0101 7  | 0110 5  |
| 6  | 0111 9  | 0110 8  | 0101 8  | 1000 6  |
| 7  | 1111 11 | 0110 9  | 0101 9  | 0100 6  |
| 8  | 1011 11 | 1110 11 | 1101 11 | 0100 7  |
| 9  | 1111 12 | 1010 11 | 1001 11 | 0100 9  |
| 10 | 1011 12 | 1110 12 | 1101 12 | 1100 11 |
| 11 | 1000 12 | 1010 12 | 1001 12 | 1000 11 |
| 12 | 1111 13 | 1110 13 | 1101 13 | 1100 12 |
| 13 | 1011 13 | 1010 13 | 1001 13 | 1100 13 |
| 14 | 0111 13 | 1011 14 | 0110 13 | 1000 13 |
| 15 | 1001 14 | 1000 14 | 1010 14 | 0001 13 |
| 16 | 0111 14 | 0110 14 | 0101 14 | 0100 14 |

T1s
NumCf

|    | 0       | 1       | 2       | 3       |
|----|---------|---------|---------|---------|
| 0  | 1111 4  | —       | —       | —       |
| 1  | 1111 6  | 1110 4  | —       | —       |
| 2  | 1011 6  | 1111 5  | 1101 4  | —       |
| 3  | 1000 6  | 1100 5  | 1110 5  | 1100 4  |
| 4  | 1111 7  | 1010 5  | 1011 5  | 1011 4  |
| 5  | 1011 7  | 1000 5  | 1001 5  | 1010 4  |
| 6  | 1001 7  | 1110 6  | 1101 6  | 1001 4  |
| 7  | 1000 7  | 1010 6  | 1001 6  | 1000 4  |
| 8  | 1111 8  | 1110 7  | 1101 7  | 1101 5  |
| 9  | 1011 8  | 1110 8  | 1010 7  | 1100 6  |
| 10 | 1111 9  | 1010 8  | 1101 8  | 1100 7  |
| 11 | 1011 9  | 1110 9  | 1001 8  | 1100 8  |
| 12 | 1000 9  | 1010 9  | 1101 9  | 1000 8  |
| 13 | 1101 10 | 0111 9  | 1001 9  | 1100 9  |
| 14 | 1001 10 | 1100 10 | 1011 10 | 1010 10 |
| 15 | 0101 10 | 1000 10 | 0111 10 | 0110 10 |
| 16 | 0001 10 | 0100 10 | 0011 10 | 0010 10 |

T1s
NumCoeff

|   | 0      | 1     | 2     | 3     |
|---|--------|-------|-------|-------|
| 0 | 01 2   | —     | —     | —     |
| 1 | 111 6  | 1 1   | —     | —     |
| 2 | 100 6  | 110 6 | 001 3 | —     |
| 3 | 011 6  | 011 7 | 010 7 | 101 6 |
| 4 | 010 6  | 011 8 | 010 8 | 000 7.|

23. The computer-readable medium of claim 21, further comprising programming instructions recorded on the computer-readable storage medium to program the apparatus to enable the apparatus to select one of said codeword tables and a fixed length codeword (FLC) to encode/decode a series of transform coefficients of luma sample blocks of a macroblock of a picture.

24. The computer-readable medium of claim 23, wherein the programming instructions are designed to equip the apparatus to select one of said codeword tables and a fixed length codeword (FLC) to encode/decode a series of transform coefficients of luma sample blocks of a macroblock of a picture in an adaptive manner, based at least in part on the number of coefficients in one or more series of transform coefficients of one or more neighboring luma sample blocks of the macroblock of the picture.

25. The computer-readable medium of claim 24, wherein the one or more neighboring luma sample blocks of the macroblock of the picture comprise at least one of an above neighbor luma sample block, and a left neighbor luma sample block of the macroblock of the picture.

26. The computer-readable medium of claim 21, further comprising programming instructions designed to program the apparatus to equip the apparatus to perform at least one of:
encoding signs of trailing one coefficients of a series of transform coefficients of sample blocks of a macroblock of a picture; and
decoding encodings of signs of trailing one coefficients of a series of transform coefficients of sample blocks of a macroblock of a picture.

27. An computer-readable storage medium comprising:
a plurality of codeword tables recorded on said computer-readable storage medium to be retrieved to program an apparatus, with each of said codeword tables having a plurality of codewords to be selectively accessed by an encoding logic or a decoding logic to perform at least one of:
encoding a level measure of a transform coefficient of a sample block of a macroblock of a picture, with said encoding being independent of encoding of a number of coefficients of the transform coefficients of the sample block; and
decoding an encoding of a level measure of a transform coefficient of a sample block of a macroblock of a picture, with said encoding being independent of encoding of a number of coefficients of the transform coefficients of the sample block.

28. The computer-readable medium of claim 27, wherein the codeword tables comprise at least one codeword table having a majority of the codewords of a selected one of

```
1
01
001
...
00000000000001
000000000000001xxxx
0000000000000001xxxxxxxxxxxx
1x
01x
001x
00000000000001x
000000000000001xxxx
0000000000000001xxxxxxxxxxxx
1xx
01xx
001xx
...
00000000000001xx
000000000000001xxxx
0000000000000001xxxxxxxxxxxx
1xxx
01xxx
001xxx
...
00000000000001xxx
000000000000001xxxx
0000000000000001xxxxxxxxxxxx
1xxxx
01xxxx
001xxxx
...
000000000000001xxxx
0000000000000001xxxxxxxxxxxx.
```

29. The computer-readable medium of claim 27, further comprising programming instructions designed to program the apparatus to enable the apparatus to select one of said codeword tables to encode/decode a level measure of a transform coefficient of a sample block of a macroblock of a picture, based at least in part on one or more of a quantization parameter of the macroblock, the number of coefficients in the block, and the level of one or more of the previously encoded/decoded transform coefficients.

30. The computer-readable medium of claim 29, wherein the codeword tables comprise different numbers of codewords; and the programming instructions are designed to equip the apparatus to encode/decode transform coefficients, symmetrically selecting smaller codeword tables before selecting larger codeword tables.

31. The computer-readable medium of claim 29, wherein the programming instructions are designed to enable the apparatus to encode the transform coefficients from a selected one of a back to front processing order and a front to back processing order.

32. The computer-readable medium of claim 27, further comprising programming instructions designed to program an apparatus to enable the apparatus to perform at least one of:
encoding signs of trailing one coefficients of a series of transform coefficients of a sample block of a macroblock of a picture; and
decoding encodings of signs of trailing one coefficients of a series of transform coefficients of a sample block of a macroblock of a picture.

33. A computer-readable storage medium comprising:
a plurality of codeword tables to be retrieved to program an apparatus, with each of said codeword tables having a plurality of codewords to be selectively accessed by an encoding logic or a decoding logic to perform at least one of:
encoding a total number of zero coefficients interposed between non-zero coefficients of a series of transform coefficients of sample blocks of a macroblock of a picture, and one or more run lengths of the zero coefficients before the respective non-zero coefficients; and
decoding an encoding of a total number of zero coefficients interposed between non-zero coefficients of a series of transform coefficients of sample blocks of a macroblock of a picture, and one or more run lengths of the zero coefficients before the respective nonzero coefficients.

34. The computer-readable medium of claim 33, wherein the codeword tables comprise at least one codeword table having a majority of the codewords of

| NumCoeff TotZeros | 1 | 2 | 3 | 4 | 5 | 6 | 7 |
|---|---|---|---|---|---|---|---|
| 0 | 1 1 | 111 3 | 101 4 | 011 5 | 101 4 | 001 6 | 001 6 |
| 1 | 011 3 | 110 3 | 111 3 | 111 3 | 100 4 | 001 5 | 001 5 |
| 2 | 010 3 | 101 3 | 110 3 | 101 4 | 011 4 | 111 3 | 101 3 |
| 3 | 011 4 | 100 3 | 101 3 | 100 4 | 111 3 | 110 3 | 100 3 |
| 4 | 010 4 | 011 3 | 100 4 | 110 3 | 110 3 | 101 3 | 011 3 |
| 5 | 011 5 | 101 4 | 011 4 | 101 3 | 101 3 | 100 3 | 11 2 |
| 6 | 010 5 | 100 4 | 100 3 | 100 3 | 100 3 | 011 3 | 010 3 |
| 7 | 011 6 | 011 4 | 011 3 | 011 4 | 011 3 | 010 3 | 001 4 |
| 8 | 010 6 | 010 4 | 010 4 | 011 3 | 010 4 | 001 4 | 001 3 |
| 9 | 011 7 | 011 5 | 011 5 | 010 4 | 001 5 | 001 3 | 000 6 |
| 10 | 010 7 | 010 5 | 010 5 | 010 5 | 001 4 | 000 6 | — |
| 11 | 011 8 | 011 6 | 001 6 | 001 5 | 000 5 | — | — |
| 12 | 010 8 | 010 6 | 001 5 | 000 5 | — | — | — |
| 13 | 011 9 | 001 6 | 000 6 | — | — | — | — |
| 14 | 010 9 | 000 6 | — | — | — | — | — |
| 15 | 001 9 | — | — | — | — | — | — |

| NumCoeff TotZeros | 8 | 9 | 10 | 11 | 12 | 13 | 14 | 15 |
|---|---|---|---|---|---|---|---|---|
| 0 | 001 6 | 001 6 | 001 5 | 000 4 | 000 4 | 000 3 | 00 2 | 0 1 |
| 1 | 001 4 | 000 6 | 000 5 | 001 4 | 001 4 | 001 3 | 01 2 | 1 1 |
| 2 | 001 5 | 001 4 | 001 3 | 001 3 | 01 2 | 1 1 | 1 1 | — |
| 3 | 011 3 | 11 2 | 11 2 | 010 3 | 1 1 | 01 2 | — | — |
| 4 | 11 2 | 10 2 | 10 2 | 1 1 | 001 3 | — | — | — |
| 5 | 10 2 | 001 3 | 01 2 | 011 3 | — | — | — | — |
| 6 | 010 3 | 01 2 | 001 4 | — | — | — | — | — |
| 7 | 001 3 | 001 5 | — | — | — | — | — | — |
| 8 | 000 6 | — | — | — | — | — | — | — |
| 9 | — | — | — | — | — | — | — | — |
| 10 | — | — | — | — | — | — | — | — |
| 11 | — | — | — | — | — | — | — | — |
| 12 | — | — | — | — | — | — | — | — |
| 13 | — | — | — | — | — | — | — | — |
| 14 | — | — | — | — | — | — | — | — |
| 15 | — | — | — | — | — | — | — | — |

| NumCoeff TotZeros | 1 | 2 | 3 |
|---|---|---|---|
| 0 | 1 1 | 1 1 | 1 1 |
| 1 | 01 2 | 01 2 | 0 1 |
| 2 | 01 3 | 00 2 | — |
| 3 | 00 3 | — | —. |

35. The computer-readable medium of claim 33, wherein the codeword tables comprise at least one codeword table having a majority of the codewords of

| ZerosLeft RunLength | 1 | 2 | 3 | 4 | 5 | 6 | >6 |
|---|---|---|---|---|---|---|---|
| 0 | 1 | 1 | 11 | 11 | 11 | 11 | 111 3 |
| 1 | 0 | 01 | 10 | 10 | 10 | 000 | 110 3 |
| 2 | — | 00 | 01 | 01 | 011 | 001 | 101 3 |
| 3 | — | — | 00 | 001 | 010 | 011 | 100 3 |
| 4 | — | — | — | 000 | 001 | 010 | 011 3 |
| 5 | — | — | — | — | 000 | 101 | 010 3 |
| 6 | — | — | — | — | — | 100 | 001 3 |
| 7 | — | — | — | — | — | — | 001 4 |
| 8 | — | — | — | — | — | — | 001 5 |
| 9 | — | — | — | — | — | — | 001 6 |
| 10 | — | — | — | — | — | — | 001 7 |
| 11 | — | — | — | — | — | — | 001 8 |
| 12 | — | — | — | — | — | — | 001 9 |
| 13 | — | — | — | — | — | — | 001 10 |
| 14 | — | — | — | — | — | — | 001 11. |

36. A video encoding method comprising:
encoding in a combined manner, by a encoding processor, a number of coefficients and a number of trailing one coefficients in a series of transform coefficients of sample blocks of a macroblock of a picture;
encoding, by said encoding processor, signs of the trailing one coefficients;
encoding, by said encoding processor, a level measure of each of the non-zero transform coefficients before the trailing one coefficients; and
encoding, by said encoding processor, a number of zero coefficients interposed between the non-zero coefficients before the trailing one coefficients, and one or more run lengths of the zero coefficients before the respective non-zero coefficients before the trailing one coefficients.

37. The method of claim 36, wherein for a luma sample block, said encoding in a combined manner, a number of coefficients and a number of trailing one coefficients in a series of transform coefficients of sample blocks of a macroblock of a picture further comprises selecting one of a plurality of codeword tables and a fixed length codeword (FLC).

38. The method of claim 37, wherein said encoding in a combined manner, a number of trailing one coefficients and a number of non-zero coefficients before the trailing one coefficients in a series of transform coefficients of a sample block of a macroblock of a picture comprises accessing one or more codeword tables including at least one codeword table having a majority of the codewords of a selected one of

|  | 0 | 1 | 2 | 3 |
|---|---|---|---|---|
| T1s |  |  |  |  |
| NumCfeff |  |  |  |  |
| 0 | 1 1 | — | — | — |
| 1 | 0101 6 | 01 2 | — | — |
| 2 | 0111 8 | 0100 6 | 0001 3 | — |
| 3 | 0111 9 | 0110 8 | 0101 7 | 0011 5 |
| 4 | 0111 10 | 0110 9 | 0101 8 | 0011 6 |
| 5 | 0111 11 | 0110 10 | 0101 9 | 0100 7 |
| 6 | 1111 13 | 0110 11 | 0101 10 | 0100 8 |
| 7 | 1011 13 | 1110 13 | 0101 11 | 0100 9 |
| 8 | 1000 13 | 1010 13 | 1101 03 | 0100 10 |
| 9 | 1111 14 | 1110 14 | 1001 13 | 0100 11 |
| 10 | 1011 14 | 1010 14 | 1101 14 | 1100 13 |
| 11 | 1111 15 | 1110 15 | 1001 14 | 1100 14 |
| 12 | 1011 15 | 1010 15 | 1101 15 | 1000 14 |
| 13 | 1111 16 | 0001 15 | 1001 15 | 1100 15 |
| 14 | 1011 16 | 1110 16 | 1101 16 | 1000 15 |
| 15 | 0111 16 | 1010 16 | 1001 16 | 1100 16 |
| 16 | 0100 16 | 0110 16 | 0101 16 | 1000 16 |
| T1s |  |  |  |  |
| NumCoeff |  |  |  |  |
| 0 | 11 2 | — | — | — |
| 1 | 1011 6 | 10 2 | — | — |
| 2 | 0111 6 | 0111 5 | 011 3 | — |
| 3 | 0111 7 | 1010 6 | 1001 6 | 0101 4 |
| 4 | 0111 8 | 0110 6 | 0101 6 | 0100 4 |
| 5 | 0100 8 | 0110 7 | 1011 7 | 0110 5 |
| 6 | 0111 9 | 0110 8 | 0101 8 | 1000 6 |
| 7 | 1111 11 | 0110 9 | 0101 9 | 0100 6 |
| 8 | 1011 11 | 1110 11 | 1101 11 | 0100 7 |
| 9 | 1111 12 | 1010 11 | 1001 11 | 0100 9 |
| 10 | 1011 12 | 1110 12 | 1101 12 | 1100 11 |
| 11 | 1000 12 | 1010 12 | 1001 12 | 1000 11 |
| 12 | 1111 13 | 1110 13 | 1101 13 | 1100 12 |
| 13 | 1011 13 | 1010 13 | 1001 13 | 1100 13 |
| 14 | 0111 13 | 1011 14 | 0110 13 | 1000 13 |
| 15 | 1001 14 | 1000 14 | 1010 14 | 0001 13 |
| 16 | 0111 14 | 0110 14 | 0101 14 | 0100 14 |
| T1s |  |  |  |  |
| NumCf |  |  |  |  |
| 0 | 1111 4 | — | — | — |
| 1 | 1111 6 | 1110 4 | — | — |
| 2 | 1011 6 | 1111 5 | 1101 4 | — |
| 3 | 1000 6 | 1100 5 | 1110 5 | 1100 4 |
| 4 | 1111 7 | 1010 5 | 1011 5 | 1011 4 |
| 5 | 1011 7 | 1000 5 | 1001 5 | 1010 4 |
| 6 | 1001 7 | 1110 6 | 1101 6 | 1001 4 |
| 7 | 1000 7 | 1010 6 | 1001 6 | 1000 4 |
| 8 | 1111 8 | 1110 7 | 1101 7 | 1101 5 |
| 9 | 1011 8 | 1110 8 | 1010 7 | 1100 6 |
| 10 | 1111 9 | 1010 8 | 1101 8 | 1100 7 |
| 11 | 1011 9 | 1110 9 | 1001 8 | 1100 8 |
| 12 | 1000 9 | 1010 9 | 1101 9 | 1000 8 |
| 13 | 1101 10 | 0111 9 | 1001 9 | 1100 9 |
| 14 | 1001 10 | 1100 10 | 1011 10 | 1010 10 |
| 15 | 0101 10 | 1000 10 | 0111 10 | 0110 10 |
| 16 | 0001 10 | 0100 10 | 0011 10 | 0010 10 |
| T1s |  |  |  |  |
| NumCoeff |  |  |  |  |
| 0 | 01 2 | — | — | — |
| 1 | 111 6 | 1 1 | — | — |
| 2 | 100 6 | 110 6 | 001 3 | — |
| 3 | 011 6 | 011 7 | 010 7 | 101 6 |
| 4 | 010 6 | 011 8 | 010 8 | 000 7. |

39. The method of claim 37, wherein said selecting of one of a plurality of codeword tables and a fixed length codeword (FLC) is performed in an adaptive manner, based at least in part on the number of coefficients in one or more series of transform coefficients of one or more neighboring luma sample blocks of the macroblock of the picture.

40. The method of claim 39, wherein the one or more neighboring luma sample blocks of the macroblock of the picture comprise at least one of an above neighbor luma sample block, and a left neighbor luma sample block of the macroblock of the picture.

41. The method of claim 36, wherein said encoding of a level measure of each non-zero transform coefficient before the trailing one coefficients comprises selectively accessing one or more codeword tables including at least one codeword table having a majority of the codewords of a selected one of

| |
|---|
| 1 |
| 01 |
| 001 |
| ... |
| 00000000000001 |
| 000000000000001xxxx |
| 0000000000000001xxxxxxxxxxxx |
| 1x |
| 01x |
| 001x |
| ... |
| 00000000000001x |
| 000000000000001xxxx |
| 0000000000000001xxxxxxxxxxxx |
| 1xx |
| 01xx |
| 001xx |
| ... |
| 00000000000001xx |
| 000000000000001xxxx |
| 0000000000000001xxxxxxxxxxxx |
| 1xxx |
| 01xxx |
| 001xxx |
| ... |
| 00000000000001xxx |
| 000000000000001xxxx |
| 0000000000000001xxxxxxxxxxxx |
| 1xxxx |
| 01xxxx |
| 001xxxx |
| ... |
| 000000000000001xxxx |
| 0000000000000001xxxxxxxxxxxx. |

42. The method of claim 36, wherein said encoding of a level measure of each non-zero transform coefficient before the trailing one coefficients comprises selecting codeword tables, based at least in part on one or more of a quantization parameter of the macroblock, the number of coefficients in the block, and the levels of one or more of the previously encoded/decoded transform coefficients.

43. The method of claim 42, wherein
the codeword tables comprise different numbers of codewords; and
said encoding of a level measure of each non-zero transform coefficient before the trailing one coefficients comprises symmetrically selecting smaller codeword tables before selecting larger codeword tables.

44. The method of claim 36, wherein said encoding of a number of zero coefficients interposed between the non-zero coefficients before the trailing one coefficients, and one or more run lengths of the zero coefficients before the respective non-zero coefficients comprises selectively accessing one or more codeword tables including at least one codeword table baying a majority of the codewords of

| NumCoeff TotZeros | 1 | 2 | 3 | 4 | 5 | 6 | 7 |
|---|---|---|---|---|---|---|---|
| 0 | 1 1 | 111 3 | 101 4 | 011 5 | 101 4 | 001 6 | 001 6 |
| 1 | 011 3 | 110 3 | 111 3 | 111 3 | 100 4 | 001 5 | 001 5 |
| 2 | 010 3 | 101 3 | 110 3 | 101 4 | 011 4 | 111 3 | 101 3 |
| 3 | 011 4 | 100 3 | 101 3 | 100 4 | 111 3 | 110 3 | 100 3 |
| 4 | 010 4 | 011 3 | 100 4 | 110 3 | 110 3 | 101 3 | 011 3 |
| 5 | 011 5 | 101 4 | 011 4 | 101 3 | 101 3 | 100 3 | 11 2 |
| 6 | 010 5 | 100 4 | 100 3 | 100 3 | 100 3 | 011 3 | 010 3 |
| 7 | 011 6 | 011 4 | 011 3 | 011 4 | 011 3 | 010 3 | 001 4 |
| 8 | 010 6 | 010 4 | 010 4 | 011 3 | 010 3 | 001 4 | 001 3 |
| 9 | 011 7 | 011 5 | 011 5 | 010 4 | 001 5 | 001 3 | 000 6 |
| 10 | 010 7 | 010 5 | 010 5 | 010 5 | 001 4 | 000 6 | — |
| 11 | 011 8 | 011 6 | 001 6 | 001 5 | 000 5 | — | — |
| 12 | 010 8 | 010 6 | 001 5 | 000 5 | — | — | — |
| 13 | 011 9 | 001 6 | 000 6 | — | — | — | — |
| 14 | 010 9 | 000 6 | — | — | — | — | — |
| 15 | 001 9 | — | — | — | — | — | — |

| NumCoeff TotZeros | 8 | 9 | 10 | 11 | 12 | 13 | 14 | 15 |
|---|---|---|---|---|---|---|---|---|
| 0 | 001 6 | 001 6 | 001 5 | 000 4 | 000 4 | 000 3 | 00 2 | 0 1 |
| 1 | 001 4 | 000 6 | 000 5 | 001 4 | 001 4 | 001 3 | 01 2 | 1 1 |
| 2 | 001 5 | 001 4 | 001 3 | 001 3 | 01 2 | 1 1 | 1 1 | — |
| 3 | 011 3 | 11 2 | 11 2 | 010 3 | 1 1 | 01 2 | — | — |
| 4 | 11 2 | 10 2 | 10 2 | 1 1 | 001 3 | — | — | — |
| 5 | 10 2 | 001 3 | 01 2 | 001 3 | — | — | — | — |
| 6 | 010 3 | 01 2 | 001 4 | — | — | — | — | — |
| 7 | 001 3 | 001 5 | — | — | — | — | — | — |
| 8 | 000 6 | — | — | — | — | — | — | — |
| 9 | — | — | — | — | — | — | — | — |
| 10 | — | — | — | — | — | — | — | — |
| 11 | — | — | — | — | — | — | — | — |
| 12 | — | — | — | — | — | — | — | — |
| 13 | — | — | — | — | — | — | — | — |
| 14 | — | — | — | — | — | — | — | — |
| 15 | — | — | — | — | — | — | — | — |

| NumCoeff TotZeros | 1 | 2 | 3 |
|---|---|---|---|
| 0 | 1 1 | 1 1 | 1 1 |
| 1 | 01 2 | 01 2 | 0 1 |
| 2 | 01 3 | 00 2 | — |
| 3 | 00 3 | — | — |

| ZerosLeft RunLength | 1 | 2 | 3 | 4 | 5 | 6 | >6 |
|---|---|---|---|---|---|---|---|
| 0 | 1 | 1 | 11 | 11 | 11 | 11 | 111 3 |
| 1 | 0 | 01 | 10 | 10 | 10 | 000 | 110 3 |
| 2 | — | 00 | 01 | 01 | 011 | 001 | 101 3 |
| 3 | — | — | 00 | 001 | 010 | 011 | 100 3 |
| 4 | — | — | — | 000 | 001 | 010 | 011 3 |
| 5 | — | — | — | — | 000 | 101 | 010 3 |
| 6 | — | — | — | — | — | 100 | 001 3 |
| 7 | — | — | — | — | — | — | 001 4 |
| 8 | — | — | — | — | — | — | 001 5 |
| 9 | — | — | — | — | — | — | 001 6 |
| 10 | — | — | — | — | — | — | 001 7 |
| 11 | — | — | — | — | — | — | 001 8 |
| 12 | — | — | — | — | — | — | 001 9 |
| 13 | — | — | — | — | — | — | 001 10 |
| 14 | — | — | — | — | — | — | 001 11 |

45. A video decoding method comprising:

decoding, via a decoding processor, a combined encoding of a number of coefficients and a number of trailing one coefficients in a series of transform coefficients of sample blocks of a macroblock of a picture;

decoding, via a decoding processor, encodings of signs of trailing one coefficients;

decoding, via a decoding processor, encodings of level measures of the non-zero transform coefficients before the trailing one coefficients; and decoding, via a decoding processor, an encoding of a number of zero coefficients interposed between the non-zero, and one or more run lengths of the zero coefficients before the respective non-zero coefficients.

46. The method of claim 45, wherein said decoding of combined encoding of a number of coefficients and a number of trailing one coefficients in a series of transform coefficients of sample blocks of a macroblock of a picture comprises accessing one or more codeword tables including at least one codeword table having a majority of the codewords of a selected one of

| | 0 | 1 | 2 | 3 |
|---|---|---|---|---|
| T1s NumCfeff | | | | |
| 0 | 1 1 | — | — | — |
| 1 | 0101 6 | 01 2 | — | — |
| 2 | 0111 8 | 0100 6 | 0001 3 | — |
| 3 | 0111 9 | 0110 8 | 0101 7 | 0011 5 |
| 4 | 0111 10 | 0110 9 | 0101 8 | 0011 6 |
| 5 | 0111 11 | 0110 10 | 0101 9 | 0100 7 |
| 6 | 1111 13 | 0110 11 | 0101 10 | 0100 8 |
| 7 | 1011 13 | 1110 13 | 0101 11 | 0100 9 |
| 8 | 1000 13 | 1010 13 | 1101 13 | 0100 10 |
| 9 | 1111 14 | 1110 14 | 1001 13 | 0100 11 |
| 10 | 1011 14 | 1010 14 | 1101 14 | 1100 13 |
| 11 | 1111 15 | 1110 15 | 1001 14 | 1100 14 |
| 12 | 1011 15 | 1010 15 | 1101 15 | 1000 14 |
| 13 | 1111 16 | 0001 15 | 1001 15 | 1100 15 |
| 14 | 1011 16 | 1110 16 | 1101 16 | 1000 15 |
| 15 | 0111 16 | 1010 16 | 1001 16 | 1100 16 |
| 16 | 0100 16 | 0110 16 | 0101 16 | 1000 16 |
| T1s NumCoeff | | | | |
| 0 | 11 2 | — | — | — |
| 1 | 1011 6 | 10 2 | — | — |
| 2 | 0111 6 | 0111 5 | 011 3 | — |
| 3 | 0111 7 | 1010 6 | 1001 6 | 0101 4 |
| 4 | 0111 8 | 0110 6 | 0101 6 | 0100 4 |
| 5 | 0100 8 | 0110 7 | 0101 7 | 0110 5 |
| 6 | 0111 9 | 0110 8 | 0101 8 | 1000 6 |
| 7 | 1111 11 | 0110 9 | 0101 9 | 0100 6 |
| 8 | 1011 11 | 1110 11 | 1101 11 | 0100 7 |
| 9 | 1111 12 | 1010 11 | 1001 11 | 0100 9 |
| 10 | 1011 12 | 1110 12 | 1101 12 | 1100 11 |
| 11 | 1000 12 | 1010 12 | 1001 12 | 1000 11 |
| 12 | 1111 13 | 1110 13 | 1101 13 | 1100 12 |
| 13 | 1011 13 | 1010 13 | 1001 13 | 1100 13 |
| 14 | 0111 13 | 1011 14 | 0110 13 | 1000 13 |
| 15 | 1001 14 | 1000 14 | 1010 14 | 0001 13 |
| 16 | 0111 14 | 0110 14 | 0101 14 | 0100 14 |
| T1s NumCf | | | | |
| 0 | 1111 4 | — | — | — |
| 1 | 1111 6 | 1110 4 | — | — |
| 2 | 1011 6 | 1111 5 | 1101 4 | — |
| 3 | 1000 6 | 1100 5 | 1110 5 | 1100 4 |
| 4 | 1111 7 | 1010 5 | 1011 5 | 1011 4 |
| 5 | 1011 7 | 1000 5 | 1001 5 | 1010 4 |
| 6 | 1001 7 | 1110 6 | 1101 6 | 1001 4 |
| 7 | 1000 7 | 1010 6 | 1001 6 | 1000 4 |
| 8 | 1111 8 | 1110 7 | 1101 7 | 1101 5 |
| 9 | 1011 8 | 1110 8 | 1010 7 | 1100 6 |
| 10 | 1111 9 | 1010 8 | 1101 8 | 1100 7 |
| 11 | 1011 9 | 1110 9 | 1001 8 | 1100 8 |

47. The method of claim 46 wherein for a luma sample block, said decoding of a combined encoding of a number of coefficients and a number of trailing one coefficients in a series of transform coefficients of a sample block of a macroblock of a picture further comprises selecting one of a plurality of codeword tables and a fixed length codeword (FLC).

48. The method of claim 47, wherein said selecting of one of a plurality of codeword tables and a fixed length codeword (FLC) is performed in an adaptive manner, based at least in part on the number of coefficients in one or more series of transform coefficients of one or more neighboring luma sample blocks of the macroblock of the picture.

49. The method of claim 48, wherein the one or more neighboring luma sample blocks of the macroblock of the picture comprise at least one of an above neighbor luma sample block, and a left neighbor luma sample block of the macroblock of the picture.

50. The method of claim 45, wherein said decoding of encodings of level measures of the non-zero transform coefficients before the trailing one coefficients comprises selectively accessing one or more codeword tables including at least one codeword table having a majority of the codewords of a selected one of

```
1
01
001
...
00000000000001
000000000000001xxxx
0000000000000001xxxxxxxxxxxx
1x
01x
001x
...
00000000000001x
000000000000001xxxx
0000000000000001xxxxxxxxxxxx
1xx
01xx
001xx
...
00000000000001xx
000000000000001xxxx
0000000000000001xxxxxxxxxxxx
1xxx
01xxx
001xxx
...
00000000000001xxx
000000000000001xxxx
0000000000000001xxxxxxxxxxxx
1xxxx
01xxxx
001xxxx
...
000000000000001xxxx
0000000000000001xxxxxxxxxxxx.
```

51. The method of claim 46, wherein said decoding of encodings of level measures of the non-zero transform coefficients before the trailing one coefficients comprises selecting codeword tables, based at least in part on one or more of a quantization parameter of the macroblock, the number of coefficients in the block, and the levels of one or more of the previously encoded/decoded transform coefficients.

52. The method of claim 51 wherein
the codeword tables comprise different numbers of codewords; and
said decoding of encodings of level measures of the non-zero transform coefficients before the trailing one coefficients comprises symmetrically selecting smaller codeword tables before selecting larger codeword tables.

53. The method of claim 45, wherein said decoding of an encoding of a number of zero coefficients interposed between the non-zero coefficients before the trailing one coefficients, and one or more run lengths of the zero coefficients before the respective non-zero coefficients comprises selectively accessing one or more codeword tables including at least one codeword table having a majority of the codewords of

| Tot- | NumCoeff | | | | | | | | |
|---|---|---|---|---|---|---|---|---|---|
| Zeros | 1 | 2 | 3 | 4 | 5 | 6 | 7 | 8 | 9 |
| 0  | 1 1   | 111 3 | 101 4 | 011 5 | 101 4 | 001 6 | 001 6 | 001 6 | 001 6 |
| 1  | 011 3 | 110 3 | 111 3 | 111 3 | 100 4 | 001 5 | 001 5 | 001 4 | 000 6 |
| 2  | 010 3 | 101 3 | 110 3 | 101 4 | 011 4 | 111 3 | 101 3 | 001 5 | 001 4 |
| 3  | 011 4 | 100 3 | 101 3 | 100 4 | 111 3 | 110 3 | 100 3 | 011 3 | 11 2  |
| 4  | 010 4 | 011 3 | 100 4 | 110 3 | 110 3 | 101 3 | 011 3 | 11 2  | 10 2  |
| 5  | 011 5 | 101 4 | 011 4 | 101 3 | 101 3 | 100 3 | 11 2  | 10 2  | 001 3 |
| 6  | 010 5 | 100 4 | 100 3 | 100 3 | 100 3 | 011 3 | 010 3 | 010 3 | 01 2  |
| 7  | 011 6 | 011 4 | 011 3 | 011 4 | 011 3 | 010 3 | 001 4 | 001 3 | 001 5 |
| 8  | 010 6 | 010 4 | 010 4 | 011 3 | 010 4 | 001 4 | 001 3 | 000 6 | — |
| 9  | 011 7 | 011 5 | 011 5 | 010 4 | 001 5 | 001 3 | 000 6 | — | — |
| 10 | 010 7 | 010 5 | 010 5 | 010 5 | 001 4 | 000 6 | — | — | — |
| 11 | 011 8 | 011 6 | 001 6 | 001 5 | 000 5 | — | — | — | — |
| 12 | 010 8 | 010 6 | 001 5 | 000 5 | — | — | — | — | — |
| 13 | 011 9 | 001 6 | 000 6 | — | — | — | — | — | — |
| 14 | 010 9 | 000 6 | — | — | — | — | — | — | — |
| 15 | 001 9 | — | — | — | — | — | — | — | — |

| Tot- | NumCoeff | | | | | | | | |
|---|---|---|---|---|---|---|---|---|---|
| Zeros | 10 | 11 | 12 | 13 | 14 | 15 | 1 | 2 | 3 |
| 0  | 001 5 | 000 4 | 000 4 | 000 3 | 00 2 | 0 1 | 1 1  | 1 1  | 1 1 |
| 1  | 000 5 | 001 4 | 001 4 | 001 3 | 01 2 | 1 1 | 01 2 | 01 2 | 0 1 |
| 2  | 001 3 | 001 3 | 01 2  | 1 1   | 1 1  | —   | 01 3 | 00 2 | —  |
| 3  | 11 2  | 010 3 | 1 1   | 01 2  | —    | —   | 00 3 | —    | —  |
| 4  | 10 2  | 1 1   | 001 3 | —     | —    | —   | —    | —    | —  |
| 5  | 01 2  | 011 3 | —     | —     | —    | —   | —    | —    | —  |
| 6  | 001 4 | —     | —     | —     | —    | —   | —    | —    | —  |
| 7  | — | — | — | — | — | — | — | — | — |
| 8  | — | — | — | — | — | — | — | — | — |
| 9  | — | — | — | — | — | — | — | — | — |
| 10 | — | — | — | — | — | — | — | — | — |
| 11 | — | — | — | — | — | — | — | — | — |
| 12 | — | — | — | — | — | — | — | — | — |
| 13 | — | — | — | — | — | — | — | — | — |
| 14 | — | — | — | — | — | — | — | — | — |
| 15 | — | — | — | — | — | — | — | — | — |

| | ZerosLeft | | | | | | |
|---|---|---|---|---|---|---|---|
| RunLength | 1 | 2 | 3 | 4 | 5 | 6 | >6 |
| 0  | 1 | 1  | 11 | 11  | 11  | 11  | 111 3 |
| 1  | 0 | 01 | 10 | 10  | 10  | 000 | 110 3 |
| 2  | — | 00 | 01 | 01  | 011 | 001 | 101 3 |
| 3  | — | —  | 00 | 001 | 010 | 011 | 100 3 |
| 4  | — | —  | —  | 000 | 001 | 010 | 011 3 |
| 5  | — | —  | —  | —   | 000 | 101 | 010 3 |
| 6  | — | —  | —  | —   | —   | 100 | 001 3 |
| 7  | — | —  | —  | —   | —   | —   | 001 4 |
| 8  | — | —  | —  | —   | —   | —   | 001 5 |
| 9  | — | —  | —  | —   | —   | —   | 001 6 |
| 10 | — | —  | —  | —   | —   | —   | 001 7 |
| 11 | — | —  | —  | —   | —   | —   | 001 8 |
| 12 | — | —  | —  | —   | —   | —   | 001 9 |
| 13 | — | —  | —  | —   | —   | —   | 001 10 |
| 14 | — | —  | —  | —   | —   | —   | 001 11. |

54. In a system, a video encoding and decoding method comprising:
a first device encoding a series of transform coefficients of sample blocks of a macroblock of a picture by
encoding in a combined manner, a number of coefficients and a number of trailing one coefficients in the series of transform coefficients;
encoding signs of the trailing one coefficients;

encoding a level measure of each of the non-zero transform coefficients before the trailing one coefficients; and encoding a number of zero coefficients interposed between the non-zero coefficients, and one or more run lengths of the zero coefficients before the respective non-zero coefficients; and a second device recovering the sample block by decoding the combined encoding of the number of coefficients and the number of trailing one coefficients in the series of transform coefficients;

decoding the encodings of the signs of the trailing one coefficients;

decoding the encodings of the level measures of the non-zero transform coefficients before the trailing one coefficients; and decoding encodings of the number of zero coefficients interposed between the non-zero coefficients, and the encodings of the one or more run lengths of the zero coefficients before the respective non-zero coefficients.

55. The method of claim 54, wherein said encoding in a combined manner, by said first device, of a number of coefficients and a number of trailing one coefficients in a series of transform coefficients of sample blocks of a macroblock of a picture, and said decoding of the combined encodings by the second device, comprises accessing one or more codeword tables including at least one codeword table having a majority of the codewords of a selected one of

|  | 0 | 1 | 2 | 3 |
|---|---|---|---|---|
| T1s NumCfeff | | | | |
| 0 | 1 1 | — | — | — |
| 1 | 0101 6 | 01 2 | — | — |
| 2 | 0111 8 | 0100 6 | 0001 3 | — |
| 3 | 0111 9 | 0110 8 | 0101 7 | 0011 5 |
| 4 | 0111 10 | 0110 9 | 0101 8 | 0011 6 |
| 5 | 0111 11 | 0110 10 | 0101 9 | 0100 7 |
| 6 | 1111 13 | 0110 11 | 0101 10 | 0100 8 |
| 7 | 1011 13 | 1110 13 | 0101 11 | 0100 9 |
| 8 | 1000 13 | 1010 13 | 1101 13 | 0100 10 |
| 9 | 1111 14 | 1110 14 | 1001 13 | 0100 11 |
| 10 | 1011 14 | 1010 14 | 1101 14 | 1100 13 |
| 11 | 1111 15 | 1110 15 | 1001 14 | 1100 14 |
| 12 | 1011 15 | 1010 15 | 1101 15 | 1000 14 |
| 13 | 1111 16 | 0001 15 | 1001 15 | 1100 15 |
| 14 | 1011 16 | 1110 16 | 1101 16 | 1000 15 |
| 15 | 0111 16 | 1010 16 | 1001 16 | 1100 16 |
| 16 | 0100 16 | 0110 16 | 0101 16 | 1000 16 |
| T1s NumCoeff | | | | |
| 0 | 11 2 | — | — | — |
| 1 | 1011 6 | 10 2 | — | — |
| 2 | 0111 6 | 0111 5 | 011 3 | — |
| 3 | 0111 7 | 1010 6 | 1001 6 | 0101 4 |
| 4 | 0111 8 | 0110 6 | 0101 6 | 0100 4 |
| 5 | 0100 8 | 0110 7 | 0101 7 | 0110 5 |
| 6 | 0111 9 | 0110 8 | 0101 8 | 1000 6 |
| 7 | 1111 11 | 0110 9 | 0101 9 | 0100 6 |
| 8 | 1011 11 | 1110 11 | 1101 11 | 0101 7 |
| 9 | 1111 12 | 1010 11 | 1001 11 | 0100 9 |
| 10 | 1011 12 | 1110 12 | 1101 12 | 1100 11 |
| 11 | 1000 12 | 1010 12 | 1001 12 | 1000 11 |
| 12 | 1111 13 | 1110 13 | 1101 13 | 1100 12 |
| 13 | 1011 13 | 1010 13 | 1001 13 | 1100 13 |
| 14 | 0111 13 | 1011 14 | 0110 13 | 1000 13 |
| 15 | 1001 14 | 1000 14 | 1010 14 | 0001 13 |
| 16 | 0111 14 | 0110 14 | 0101 14 | 0100 14 |

|  | 0 | 1 | 2 | 3 |
|---|---|---|---|---|
| T1s NumCf | | | | |
| 0 | 1111 4 | — | — | — |
| 1 | 1111 6 | 1110 4 | — | — |
| 2 | 1011 6 | 1111 5 | 1101 4 | — |
| 3 | 1000 6 | 1100 5 | 1110 5 | 1100 4 |
| 4 | 1111 7 | 1010 5 | 1011 5 | 1011 4 |
| 5 | 1011 7 | 1000 5 | 1001 5 | 1010 4 |
| 6 | 1001 7 | 1110 6 | 1101 6 | 1001 4 |
| 7 | 1000 7 | 1010 6 | 1001 6 | 1000 4 |
| 8 | 1111 8 | 1110 7 | 1101 7 | 1101 5 |
| 9 | 1011 8 | 1110 8 | 1010 7 | 1100 6 |
| 10 | 1111 9 | 1010 8 | 1101 8 | 1100 7 |
| 11 | 1011 9 | 1110 9 | 1001 8 | 1100 8 |
| 12 | 1000 9 | 1010 9 | 1101 9 | 1000 8 |
| 13 | 1101 10 | 0111 9 | 1001 9 | 1100 9 |
| 14 | 1001 10 | 1100 10 | 1011 10 | 1010 10 |
| 15 | 0101 10 | 1000 10 | 0111 10 | 0110 10 |
| 16 | 0001 10 | 0100 10 | 0011 10 | 0010 10 |
| T1s NumCoeff | | | | |
| 0 | 01 2 | — | — | — |
| 1 | 111 6 | 1 1 | — | — |
| 2 | 100 6 | 110 6 | 001 3 | — |
| 3 | 011 6 | 011 7 | 010 7 | 101 6 |
| 4 | 010 6 | 011 8 | 010 8 | 000 7. |

56. The method of claim 54 wherein for a luma sample block, said encoding in a combined manner, by the first device, of a number of coefficients and a number of trailing one coefficients in a series of transform coefficients of sample blocks of a macroblock of a picture further, and said decoding of the combined encodings by the second device, comprises selecting one of a plurality of codeword tables and a fixed length codeword (FLC).

57. The method of claim 56, wherein said selecting of one of a plurality of codeword tables and a fixed length codeword (FLC) is performed in an adaptive manner, based at least in part on the number of coefficients in one or more series of transform coefficients of one or more neighboring luma sample blocks of the macroblock of the picture.

58. The method of claim 57, wherein the one or more neighboring luma sample blocks of the macroblock of the picture comprise at least one of an above neighbor luma sample block, and a left neighbor luma sample block of the macroblock of the picture.

59. The method of claim 54, wherein said encoding by the first device, of level measures of the non-zero transform coefficients before the trailing one coefficients, and said decoding of the level measure encodings by the second device, comprises selectively accessing one or more codeword tables including at least one codeword table having a majority of the codewords of a selected one of

```
1
01
001
...
00000000000001
000000000000001xxxx
0000000000000001xxxxxxxxxxxx
1x
```

```
01x
001x
...
00000000000001x
000000000000001xxxx
0000000000000001xxxxxxxxxxx
1xx
01xx
001xx
...
00000000000001xx
000000000000001xxxx
0000000000000001xxxxxxxxxxx
1xxx
01xxx
001xxx
...
00000000000001xxx
000000000000001xxxx
0000000000000001xxxxxxxxxxx
1xxxx
01xxxx
001xxxx
...
000000000000001xxxx
0000000000000001xxxxxxxxxxx.
```

60. The method of claim 54, wherein said encoding by the first device, of level measures of the non-zero transform coefficients before the trailing one coefficients, and said decoding of the level measure encodings by the second device, comprises selecting codeword tables, based at least in part on one or more of a quantization parameter of the macroblock, the number of coefficients in the block, and the level of one or more of the previously encoded/decoded transform coefficients.

61. The method of claim 60, wherein the codeword tables comprise different numbers of codewords; and said encoding by the first device, of the level measures of the non-zero transform coefficients before the trailing one coefficients, and the decoding of the level measures by the second device, comprises symmetrically selecting smaller codeword tables before selecting larger codeword tables.

62. The method of claim 54, wherein said encoding by the first device, of a number of zero coefficients interposed between the non-zero coefficients, and one or more run lengths of the zero coefficients before the respective nonzero coefficients, and said decoding of the number of zero coefficients and run length encodings by the second device, comprises selectively accessing one or more codeword tables including at least one codeword table having a majority of the codewords of

| Tot-Zeros | NumCoeff |||||||||
|---|---|---|---|---|---|---|---|---|---|
| | 1 | 2 | 3 | 4 | 5 | 6 | 7 | 8 | 9 |
| 0 | 1 1 | 111 3 | 101 4 | 011 5 | 101 4 | 001 6 | 001 6 | 001 6 | 001 6 |
| 1 | 011 3 | 110 3 | 111 3 | 111 3 | 100 4 | 001 5 | 001 5 | 001 4 | 000 6 |
| 2 | 010 3 | 101 3 | 110 3 | 101 4 | 011 4 | 111 3 | 101 3 | 001 5 | 001 4 |
| 3 | 011 4 | 100 3 | 101 3 | 100 4 | 111 3 | 110 3 | 100 3 | 011 3 | 11 2 |
| 4 | 010 4 | 011 3 | 100 4 | 110 3 | 110 3 | 101 3 | 011 3 | 11 2 | 10 2 |
| 5 | 011 5 | 101 4 | 011 4 | 101 3 | 101 3 | 100 3 | 11 2 | 10 2 | 001 3 |
| 6 | 010 5 | 100 4 | 100 3 | 100 3 | 100 3 | 011 3 | 010 3 | 010 3 | 01 2 |
| 7 | 011 6 | 011 4 | 011 3 | 011 4 | 011 3 | 010 3 | 001 4 | 001 3 | 001 5 |
| 8 | 010 6 | 010 4 | 010 4 | 011 3 | 010 4 | 001 4 | 001 3 | 000 6 | — |
| 9 | 011 7 | 011 5 | 011 5 | 010 4 | 001 5 | 001 3 | 000 6 | — | — |
| 10 | 010 7 | 010 5 | 010 5 | 010 5 | 001 4 | 000 6 | — | — | — |
| 11 | 011 8 | 011 6 | 001 6 | 001 5 | 000 5 | — | — | — | — |
| 12 | 010 8 | 010 6 | 001 5 | 000 5 | — | — | — | — | — |
| 13 | 011 9 | 001 6 | 000 6 | — | — | — | — | — | — |
| 14 | 010 9 | 000 6 | — | — | — | — | — | — | — |
| 15 | 001 9 | — | — | — | — | — | — | — | — |

| Tot-Zeros | NumCoeff |||||||||
|---|---|---|---|---|---|---|---|---|---|
| | 10 | 11 | 12 | 13 | 14 | 15 | 1 | 2 | 3 |
| 0 | 001 5 | 000 4 | 000 4 | 000 3 | 00 2 | 0 1 | 1 1 | 1 1 | 1 1 |
| 1 | 000 5 | 001 4 | 001 4 | 001 3 | 01 2 | 1 1 | 01 2 | 01 2 | 0 1 |
| 2 | 001 3 | 001 3 | 01 2 | 1 1 | 1 1 | — | 01 3 | 00 2 | — |
| 3 | 11 2 | 010 3 | 1 1 | 01 2 | — | — | 00 3 | — | — |
| 4 | 10 2 | 1 1 | 001 3 | — | — | — | — | — | — |
| 5 | 01 2 | 011 3 | — | — | — | — | — | — | — |
| 6 | 001 4 | — | — | — | — | — | — | — | — |
| 7 | — | — | — | — | — | — | — | — | — |
| 8 | — | — | — | — | — | — | — | — | — |
| 9 | — | — | — | — | — | — | — | — | — |
| 10 | — | — | — | — | — | — | — | — | — |
| 11 | — | — | — | — | — | — | — | — | — |
| 12 | — | — | — | — | — | — | — | — | — |
| 13 | — | — | — | — | — | — | — | — | — |
| 14 | — | — | — | — | — | — | — | — | — |
| 15 | — | — | — | — | — | — | — | — | — |

| RunLength | ZerosLeft ||||||| |
|---|---|---|---|---|---|---|---|
| | 1 | 2 | 3 | 4 | 5 | 6 | >6 |
| 0 | 1 | 1 | 11 | 11 | 11 | 11 | 111 3 |
| 1 | 0 | 01 | 10 | 10 | 10 | 000 | 110 3 |
| 2 | — | 00 | 01 | 01 | 011 | 001 | 101 3 |
| 3 | — | — | 00 | 001 | 010 | 011 | 100 3 |
| 4 | — | — | — | 000 | 001 | 010 | 011 3 |
| 5 | — | — | — | — | 000 | 101 | 010 3 |
| 6 | — | — | — | — | — | 100 | 001 3 |
| 7 | — | — | — | — | — | — | 001 4 |
| 8 | — | — | — | — | — | — | 001 5 |
| 9 | — | — | — | — | — | — | 001 6 |
| 10 | — | — | — | — | — | — | 001 7 |
| 11 | — | — | — | — | — | — | 001 8 |
| 12 | — | — | — | — | — | — | 001 9 |
| 13 | — | — | — | — | — | — | 001 10 |
| 14 | — | — | — | — | — | — | 001 11. |

* * * * *